(12) United States Patent
Gradinaru et al.

(10) Patent No.: US 10,581,155 B1
(45) Date of Patent: Mar. 3, 2020

(54) ACTIVE INTERFERENCE CANCELLATION

(71) Applicant: Amazon Technologies, Inc., Seattle, WA (US)

(72) Inventors: Adrian Gradinaru, San Jose, CA (US); Morris Yuanhsiang Hsu, Mountain View, CA (US); Cheol Su Kim, San Jose, CA (US); Jaiyoung Park, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/144,743

(22) Filed: Sep. 27, 2018

(51) Int. Cl.
  *H04B 1/38* (2015.01)
  *H01Q 1/52* (2006.01)
  *H04B 1/40* (2015.01)
  *H04B 1/00* (2006.01)

(52) U.S. Cl.
  CPC ........... *H01Q 1/523* (2013.01); *H04B 1/0064* (2013.01); *H04B 1/40* (2013.01)

(58) Field of Classification Search
  CPC ......... H01Q 1/523; H04B 1/0064; H04B 1/40
  USPC ........................................................ 375/219
  See application file for complete search history.

(56) References Cited

U.S. PATENT DOCUMENTS

| | | | | |
|---|---|---|---|---|
| 5,117,505 A | * | 5/1992 | Talwar | H04B 1/126 343/853 |
| 5,548,838 A | * | 8/1996 | Talwar | H04B 1/126 455/272 |
| 5,729,829 A | * | 3/1998 | Talwar | H04B 1/525 455/296 |
| 8,036,606 B2 | * | 10/2011 | Kenington | H04B 1/525 455/78 |
| 9,407,298 B1 | * | 8/2016 | Hwang | H04B 1/10 |
| 9,641,205 B1 | * | 5/2017 | Hyun | H04B 1/0475 |
| 2006/0291598 A1 | * | 12/2006 | Gebara | H01Q 1/521 375/346 |
| 2007/0060059 A1 | * | 3/2007 | Kim | H04B 1/123 455/63.1 |
| 2008/0192877 A1 | * | 8/2008 | Eliezer | H03L 7/1806 375/376 |
| 2010/0197233 A1 | * | 8/2010 | Kim | H04B 1/7103 455/63.1 |
| 2011/0033000 A1 | * | 2/2011 | Berens | H04W 52/10 375/260 |
| 2015/0188736 A1 | * | 7/2015 | Kesling | H04L 25/08 375/285 |

* cited by examiner

*Primary Examiner* — Helene E Tayong
(74) *Attorney, Agent, or Firm* — Lowenstein Sandler LLP

(57) ABSTRACT

Antenna structures and methods of operating the same are described. One apparatus includes a processing device that executes an active interference cancellation (AIC) algorithm and radio frequency front-end (RFFE) circuitry coupled to the processing device. The RFFE circuitry includes two RF couplers, a fixed-delay filter, and an interference compensation circuit part of an electrical path between the two RF couplers. The AIC algorithm is operable to control the interference compensation circuit to adjust a phase, an amplitude or both of a copy of a first RF signal transmitted on a first antenna to remove corresponding interference in a second RF signal received at a second antenna that is caused by the first RF signal. The processing device triggers a re-calibration in the AIC algorithm when the digital values, received from a power detector circuit, indicate a change in impedance that exceeds a threshold.

20 Claims, 10 Drawing Sheets

ACTIVE INTERFERENCE CANCELLATION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
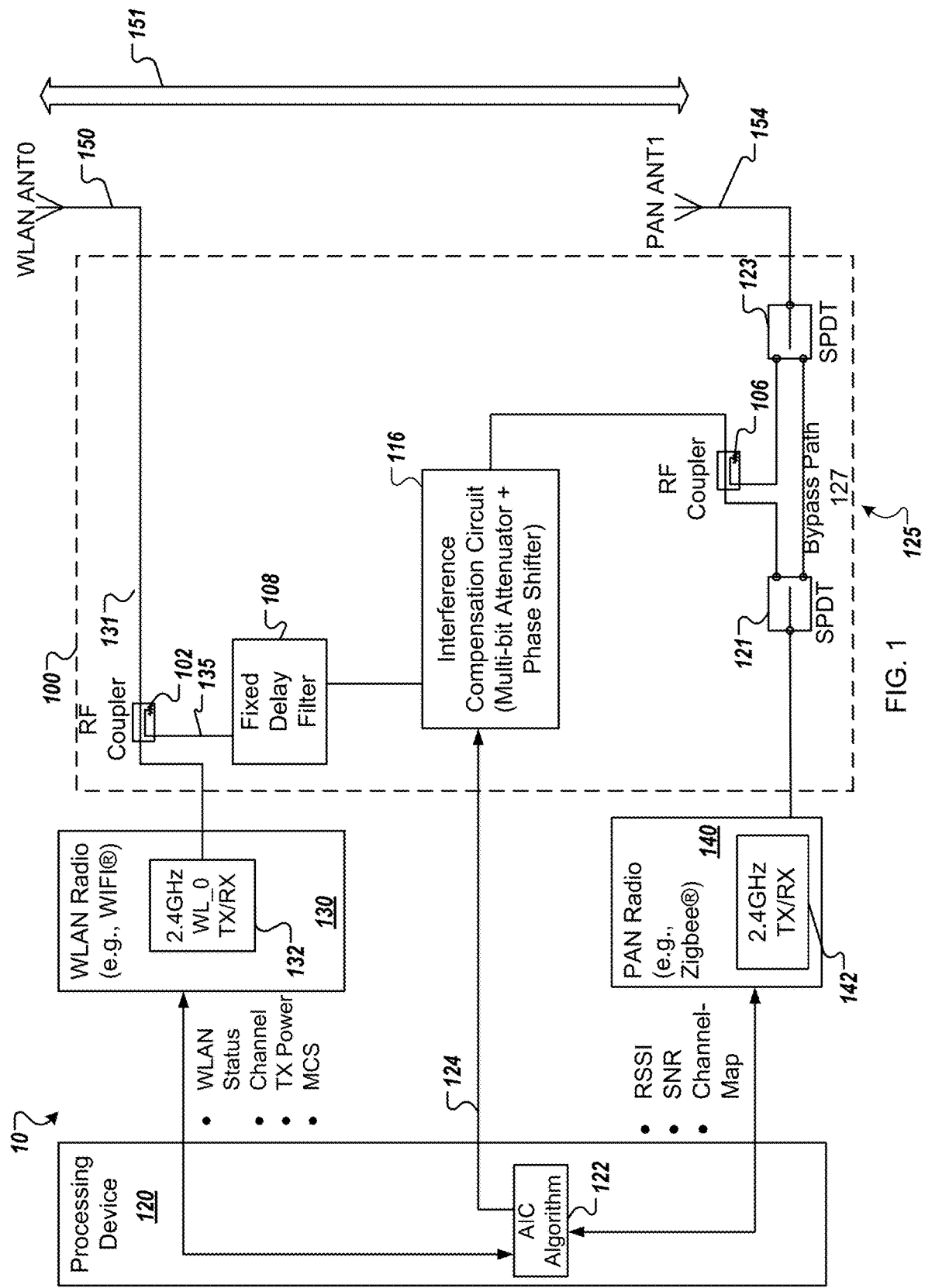
FIG. 1 is a block diagram of radio frequency front-end (RFFE) circuitry for active interference cancellation (AIC) according to one embodiment.

Active Interference Cancellation (AIC) techniques and AIC circuitry that enable simultaneous operation of multiple radios in the same frequency band on a compact device are described. AIC offers a different coexistence mitigation solution than Packet Traffic Arbitration (PTA). PTA makes the radios coexist by letting one radio operate at a time. However, there are features such as Whole Home Audio (WHA) that requires significant amount of wireless local area network (WLAN) traffic (e.g., the Wi-Fi® transmission) while features such as Smart Home security monitoring require listening to a personal area network (PAN) radio (e.g., ZigBee® endpoints or BLE radios) at all time for low latency and high reliability. Frustration Free Setup (FFS) can have the PAN radio constantly scanning for new devices. Time-sharing between the WLAN and PAN radios becomes a complex trade-off of latency, reliability, and quality of the features, leaving little air time for new features to further improve customer experience. Increased electrical isolation between coexisting radios and antennas will alleviate the time-sharing requirement. This is often realized by increasing spatial separation between the coexisting radios. However, compact, elegant and desirable devices while the extra cost associated with spatially separate designs can be significant. Compact devices will be both desirable and cost effective when the PAN radio is implemented on the same printed circuit board (PCB) as the WLAN radio.

The 2.4 GHz industrial, scientific, and medical (ISM) radio band allows unlicensed wireless communications. Due to its unlicensed nature, many short ranged, low power wireless communication systems operate in this frequency band. Since these radios occupy the same spectrum, careful designs are required to prevent interference between one another, often at the cost of reduced throughput or range for the radios. To support multiple radios operating in the same frequency band on compact devices, the conventional implementations use time-switched architectures, such as illustrated in FIG. 8A. In this architecture, a single radio can transmit or receive at any given time, and there is no performance degradation due to inter-radio interference during a given time slot. However, it has poor data throughput and higher latency because of the need to switch between the two radios. In order to improve spectrum usage, to reduce latency, and to increase data throughput, there is a rising interest to implement simultaneous operation architecture, as described herein and depicted in FIG. 8B as compared to the architecture illustrated in FIG. 8A. For multi-user multiple-input multiple-output (MU-MIMO) antenna system, two to eight antennas may be used to achieve data rates up to several Gbits/s. However, radios using different technologies may need separate antennas. For example, the system may include one antenna using the Bluetooth® technology for 2.4 GHz BT-LE and another antenna using the Zigbee® technology for 2.4 GHz. Traditionally, these antennas need to be separated in space or time-division multiplexed during operation. For another example, the system may include one antenna using Wi-Fi® technology for 2.4 GHz and another antenna using the Bluetooth® technology for 2.4 GHz BT-LE. Similarly, these antennas need to be separated in space or time-divisional multiplexed during operation.

In the architectures of the embodiments described herein, both radios (e.g., WLAN and PAN radios) can transmit and receive simultaneously. However, since both radios are on at the same time, one system's transmit signal will present itself as unwanted signal at the other system's receiver, causing interference. Because of this interference, the operable range may be reduced. To maximize the operable range, an isolation of at least 60 dB is desired between the two radios' antennas. However, this isolation is difficult to achieve in compact consumer electronics. As described herein, radio frequency front end (RFFE) circuitry and the Active Interference Cancellation (AIC) techniques can be used to reduce or remove interference in these simultaneous operation architectures. For example, the PAN radio and the WLAN radio can be implemented on the same PCB when using the AIC techniques and AIC circuitry, described herein, enabling simultaneous operation of multiple radios in the same frequency band on the compact device. The AIC techniques described herein make use of the fact that the device knows exactly what an aggressor radio is transmitting and the impedance of its antenna. By copying the aggressor transmit signal, and manipulating the amplitude and phase of the copied signal, AIC circuitry can present a signal equal in amplitude but 180° out of phase to the signal that normally shows up at the victim receiver through the antenna coupling. When these two signals are added together in the victim's receiver input, the aggressor signal will be removed due to destructive interference. AIC isolation changes with environments, is sensitive to impedance changes, and is dependent on temperature. One AIC implementation includes detecting changes in the antenna VSWR by measuring reflected waves at the antenna, and triggering a new AIC calibration such to regain optimum isolation.

One apparatus includes a processing device that executes an active interference cancellation (AIC) algorithm and radio frequency front-end (RFFE) circuitry coupled to the processing device. The RFFE circuitry includes two RF couplers, a fixed-delay filter, and an interference compensation circuit placed as part of an electrical path between the two RF couplers. The AIC algorithm is operable to control the interference compensation circuit to adjust a phase, an amplitude, or both of a copy of a first RF signal transmitted on a first antenna to remove corresponding interference in a second RF signal received at a second antenna that is caused by the first RF signal. The processing device triggers a re-calibration in the AIC algorithm when the digital values (or codes), received from a power detector circuit, indicate a change in impedance that exceeds a threshold. The adjusted RF signal is added to the second RF signal via the second RF coupler to remove from the second RF signal interference caused by the first RF signal. The interference is removed from the third RF signal using destructive interference when the phase, amplitude, and optionally the delay are adjusted in the copy of the first RF signal appropriately using the AIC techniques described herein.

The antenna structures described herein can be used for wireless local area network (WLAN) technologies (e.g., Wi-Fi® technologies), personal area network (PAN) technologies (e.g., Bluetooth® and Zigbee® technologies), wireless area network (WAN) technologies, such as cellular technologies including Long Term Evolution (LTE) frequency bands, third generation (3G) frequency bands, global navigation satellite system (GNSS) frequency bands (e.g., positioning system (GPS) frequency bands, or the like.

FIG. 1 is a block diagram of radio frequency front-end (RFFE) circuitry 100 for active interference cancellation (AIC) according to one embodiment. The RFFE circuitry 100 may reside in an electronic device 10, such as a portable electronic device as described herein. The RFFE circuitry 100 is coupled to a processing device 120, a wireless local area network (WLAN) radio 130 (also referred to as WLAN module), a personal area network (PAN) 140 radio (also referred to as PAN module), a first WLAN antenna 150, and a PAN antenna 154. The RFFE circuitry 100 includes a first RF coupler 102, a second RF coupler 106, a fixed-delay filter 108, and an interference compensation circuit 116. The first RF coupler 102 is coupled between the first WLAN antenna 150 and a first transceiver 132 of the WLAN radio 130. The first transceiver 132 of the WLAN radio 130 can transmit or receive RF signals via the first WLAN antenna 150. When transmitting a transmit signal by the first transceiver 132 on a transmit path 131, the first RF coupler 102 creates a copy of the transmit signal on a cancellation path 135. The cancellation path 135 is an electrical path with one or more components used to adjust a delay, phase, amplitude, or any combination thereof of a copy of an RF signal from the first transceiver 132. In one embodiment, disposed along the cancellation path 135 are the fixed-delay filter 108 and interference compensation circuit 116. In other embodiments, more or less components can be disposed on the cancellation path 135. The second RF coupler 106 is coupled between a transceiver 142 of the PAN radio 140 and the PAN antenna 154. The transceiver 142 of the PAN radio 140 can transmit or receive RF signals via the PAN antenna 154. When receiving an RF signal by the transceiver 142 via the PAN antenna 154, the second RF coupler 106 combines the copy of the transmit signal on the cancellation path 135 with the RF signal received via the PAN antenna 154.

On the cancellation path 135, the fixed-delay filter 108 is coupled to the first RF coupler 102 and the interference compensation circuit 116 is coupled to the fixed-delay filter 108. The fixed-delay filter 108 can be pre-programmed or pre-defined to select a delay for the cancellation path 135. The fixed-delay filter 108 can be pre-programmed or pre-defined to match a delay in the cancellation path 135 to a propagation delay in an antenna path 151 between the first WLAN antenna 150 and the PAN antenna 154. The interference compensation circuit 116 can be controlled by the processing device 120 (e.g., AIC algorithm 122) to adjust a phase, an amplitude, or both of the copy of the RF signal from the first transceiver 132. The second RF coupler 106 combines RF signals from the cancellation path 135 with the RF signals received via the PAN antenna 154 to remove interference in the RF signals received via the PAN antenna 154, the interference being caused by the RF signals transmitted via the WAN antenna 150.

In one embodiment, wherein the processing device is operable to execute an AIC algorithm 122 to control the interference compensation circuit 116 to adjust the phase, the amplitude or both of the RF signal from a first WLAN radio, In a further embodiment, the AIC algorithm is operable to activate a bypass circuit 125 that provides a bypass path 127.

In the depicted embodiment, the RFFE 100 also includes a bypass circuit 125 including a first single pole, double throw (SPDT) switch 121 connected to the PAN radio 140 and a second SPDT switch 123 connected to the PAN antenna. A first terminal of the first SPDT switch 121 is connected to the second RF coupler 106. A first terminal of the second SPDT switch 123 is connected to the second RF coupler 106. A second terminal of the first SPDT switch 12 is connected to a second terminal of the second SPDT switch 123. In other embodiments, other bypass circuits may be used. Alternatively, the RFFE 110 also does not include a bypass circuit. The bypass circuit 125 can be controlled by the processing device 120 (e.g., AIC algorithm). For example, the AIC algorithm 122 can activate the bypass circuit 125 when in operation to remove interference between the two radios when both antennas are operational and can deactivate the bypass circuit 125 when only one or none of the radios is operational.

The electronic device 10 also includes the processing device 120. The processing device 120 is operable to execute the AIC algorithm 122 to control the interference compensation circuit 116. The processing device 120 also includes an interface 124 (e.g., a serial interface like I2C interface) that can be used by the AIC algorithm 122 to generate one or more signals (e.g., voltage levels) to control the first interference compensation circuit 116. The AIC algorithm 122 can control various other switches and parameters of the RFFE circuitry 100. In one embodiment, the AIC algorithm 122 can communicate with the interference compensation circuit 116 over the interface 124 to set parameters, such as voltage levels of the inputs of the interference compensation circuit 116.

In the depicted embodiment, the processing device 120 is an application processor that supports AIC. The application processor may include the following software features to support AIC: 1) Adaptive algorithm 122 to optimize AIC control parameters, as described below with respect to a search algorithm described below; 2) An interface between the processing device 120 and WLAN radio 130 (e.g., the Wi-Fi® chipset) to communicate a WLAN status of WLAN radio 130, like if WLAN transmit (TX) is active, a WLAN channel at which WLAN TX is operating, modulation and coding scheme (MCS) in use, or the like; 3) An interface between processing device 120 and the PAN radio 140 (e.g., the ZigBee/BLE chipset) to communicate measurements like received signal strength indicator (RSSI), signal to noise ratio (SNR), or the like; 4) A interface definition to control the interference compensation circuit 116 during a AIC mode; and 5) general-purpose input-output (GPIO) control to support various switch configurations, such as the switches described above, including a bypass mode by controlling the first SPDT switch 121 and the second SPDT switch 123 of the bypass circuit 125 described above. The processing device 120 may also include another interface to couple to a power detector circuit as described herein. Alternatively, the signals from the power detector circuit can be sent over the interface between the processing device 120 and WLAN radio 130 or the interface between processing device 120 and the PAN radio 140.

The electronic device 10 (also referred to herein as a user device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, and the like. The electronic device 10 may also be an audio-input-enabled device, such as the Amazon Echo device, developed by Amazon Technologies, Inc. of Seattle Wash. Alternatively, the electronic device 10 may be a set-top box (STB) or other media streaming device. The electronic device may connect to a network to obtain content from a server computing system (e.g., an item providing system) or to perform other activities. The electronic device may connect to one or more different types of cellular networks.

The electronic device 10 includes a circuit board, such as a printed circuit board (PCB) upon which one or more of the components described above is disposed. The components can be integrated into one or more integrated circuits. In some embodiments, the WLAN radio 130 and the PAN radio 140 are separate integrated circuits or chipsets. In one embodiment, the RF radios (or RF modules) reside on a common carrier substrate die of an integrated circuit. In other embodiments, a processing device 120 is disposed on the PCB along with the RF radios and the RFFE circuitry 100. The processing device 120 is operable to control the RF radios (e.g., 130, 140) to radiate electromagnetic energy concurrently in the first frequency range via the first WLAN 150 and PAN antenna 154. Alternatively, the processing device 120 can be disposed on another circuit board than the RF radios. Alternatively, the RF radios can be implemented as RF circuitry in a single integrated circuit. In one embodiment, the RF circuitry includes a WLAN radio and PAN radio. In other embodiments, the RF radios may be specific to the frequency bands of interest. The processing device 120 may be an application processor (AP) that implements the AIC algorithm 122. The AP may be used for other operations of the electronic device. In another embodiment, a dedicated microcontroller with digital-to-analog (DAC) pins to create an AIC-specific implementation. In another embodiment, an application-specific integrated circuit (ASIC), a field-programmable gate array (FPGA), or other mixed-signal integrated circuits may be used to implement the AIC algorithm and control signals to control the RFFE 100. In another embodiment, the AIC algorithm 122 can be implemented in the PAN radio 140 so long as the PAN radio has sufficient computing resources for computations to control the interference compensation circuit 116. Alternatively, the AIC algorithm 122 can be implemented on other devices than the processing device 120 and the PAN radio 140.

The WLAN radio 130 may include two transceivers to operate in a MIMO architecture. The transceiver 132 (and any additional transceivers) of the WLAN radio 130 can operate at 2.45 GHz and may implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wirelessly using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio 130 may include additional transceivers that operate in the 2.45 GHz, 5 GHz, or both. The PAN module 140 includes a transceiver that also operates at 2.4 GHz and may implement the Bluetooth® technology. The WLAN radio 130 and PAN radio 140 can be individual chipsets, even chipsets provided by different vendors. The WLAN radio 130 and the PAN radio 140 may be implemented in the same chipset or on a common carrier substrate with the processing device 120, such as in a System on Chip (SoC) architecture. In another embodiment, other wireless RF radios may be used to implement other technologies, such as the LTE technology, the Zigbee® technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a personal area network (PAN) radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

In one embodiment, the first transceiver 132 of the WLAN radio 130 is operable to radiate electromagnetic energy via the first WLAN antenna 150 in a first frequency range. The transceiver 142 of the PAN radio 140 is operable to radiate electromagnetic energy via the PAN antenna 154 in the first frequency range concurrently with the first transceiver 134. For example, the WLAN radio 130 can use the Wi-Fi® technology in the 2.45 GHz frequency band and the PAN radio 140 can use the Bluetooth® technology in the 2.45 GHz frequency band concurrently with sufficient isolation between the WLAN radio 130 and the PAN radio 140. This isolation can be achieved with the RFFE circuitry 100 that implements AIC and does so without time switching architecture as done conventionally in compact portable devices.

In some embodiments, the WLAN radio 130 can be configured to operate multiple antennas in a beam-forming manner. Alternatively, the first transceiver 132 and the transceiver 142 of the PAN radio 140 can operate the first WLAN antenna 150 and the PAN antenna 154 concurrently with sufficient isolations because of the RFFE circuitry 100 that implements AIC as described herein.

In one embodiment, the electronic device 10 includes a multi-bit digital attenuator and multi-bit phase shifter for matching amplitude and phase, a delay filter for matching group delays, two couplers for sampling and summing the RF signals, and a bypass path formed by 2 SPDTs for minimizing performance degradation when AIC is not needed. The multi-bit digital attenuator may be a cascaded series of phase shifters with or without amplification. Referring to FIG. 1, the interference compensation circuit 116 of the RFFE 100 includes a multi-bit digital attenuator that adjusts an amplitude of a copy of a first RF signal from the WLAN radio 130 and a multi-bit phase shifter circuit that adjusts a phase of the copy of the first RF signal. The AIC algorithm 122 controls the interference compensation circuit 116 to adjust the phase, the amplitude or both of the copy of the first RF signal to remove corresponding interference in a second RF signal received at the PAN antenna 154, the interference being caused by the first RF signal transmitted by the WLAN antenna 150.

Figure 4:
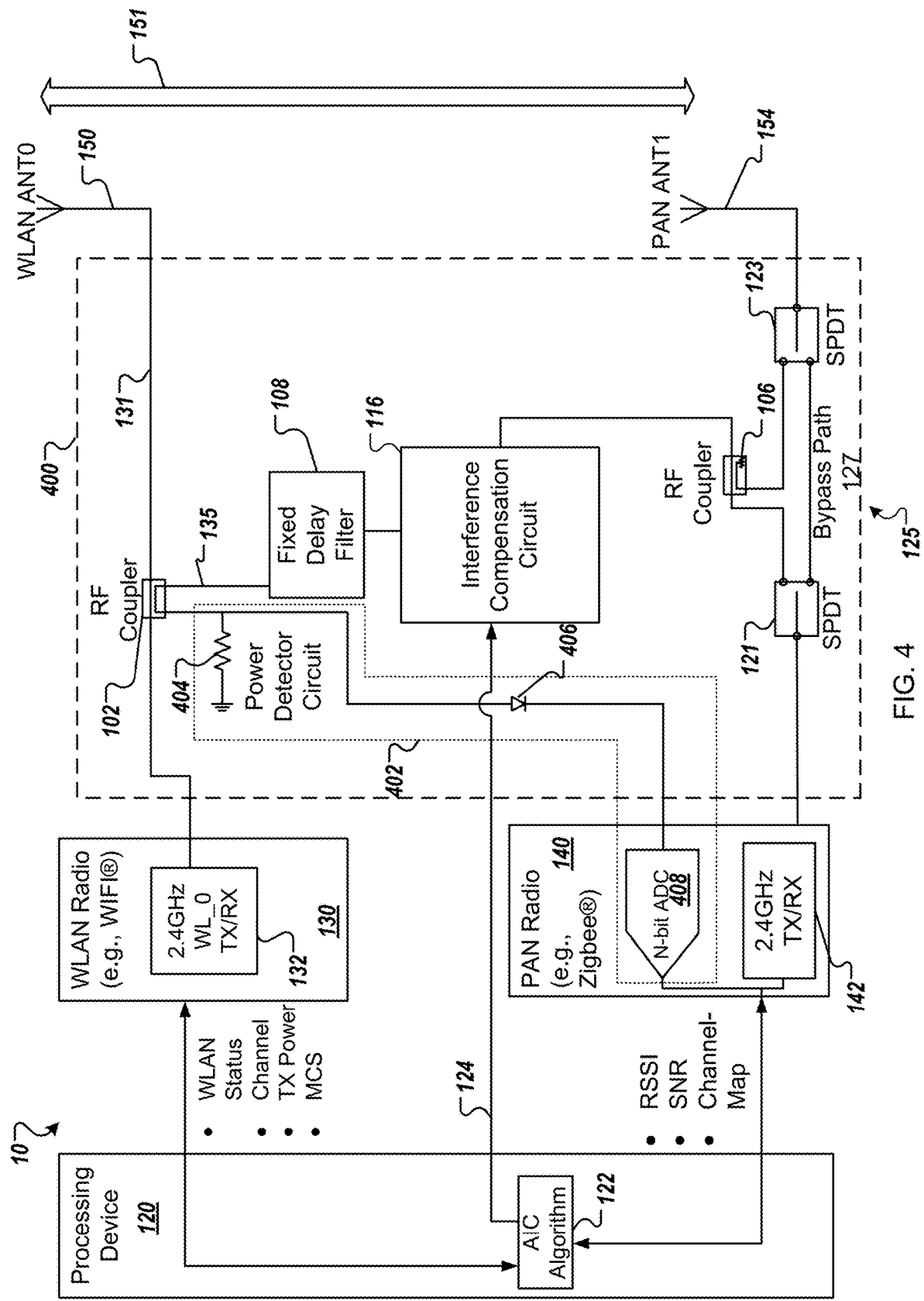
FIG. 4 is a block diagram of RFFE circuitry with a power detector circuit for AIC according to one embodiment.

In another embodiment, the interference compensation circuit 116 of the RFFE 100 further includes a power detector circuit (such as illustrated in FIG. 4). The power detector circuit is coupled to the first RF coupler 102. The power detector circuit measures voltage values at the first RF coupler 102 and provides digital values, corresponding to the voltage values, to the processing device 120, such as feedback to the AIC algorithm 122 or a process that can trigger a re-calibration in the AIC algorithm 122. The digital values are indicative of impedance of the WLAN antenna 150. When there are significant changes to the impedance of the WLAN antenna 150, the power detector circuit can detect the change in impedance and trigger re-calibration in the AIC algorithm 122. The change in impedance may be caused by a change in antenna environment. By operating the radios in a second antenna environment, instead of a first antenna environment, the impedance of the WLAN antenna 150 may change, affecting the performance of the AIC isolation. By detecting the change in impedance, the AIC algorithm can re-calibrate for the second antenna environment. As described herein, the change in impedance can be detected by detecting reflected waves from the antenna, feeding the resulting voltage into an analog-to-digital converter (ADC), and triggering re-calibration for the change in impedance. In some embodiments, the power detector circuit is integrated on the same silicon die as the impedance compensation circuit (e.g., same integrated circuit as the multi-bit digital attenuator and multi-bit phase shifter circuitry).

Figure 2:
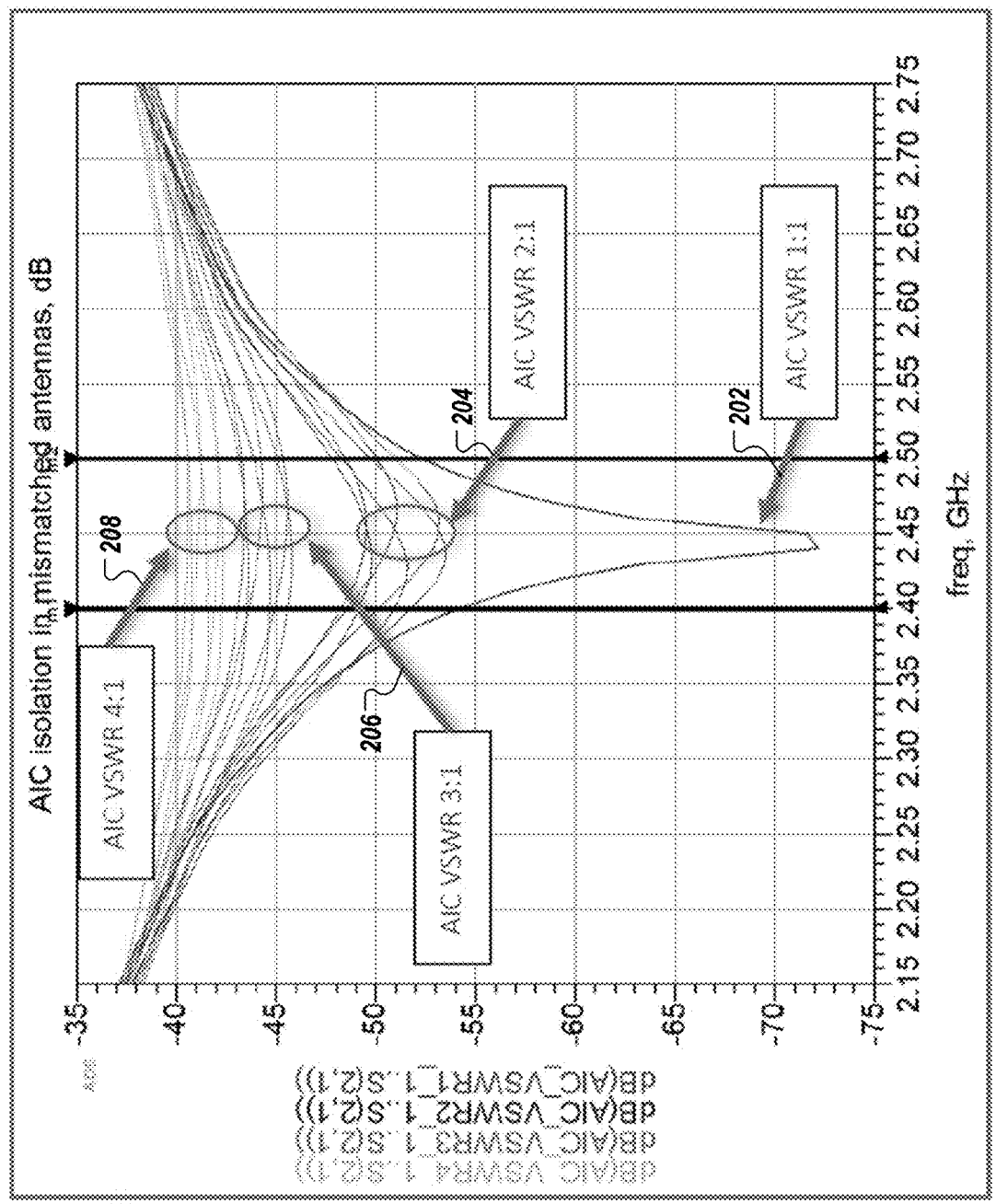
FIG. 2 is a graph illustrating variability of AIC isolation in mismatched antennas according to one embodiment.

In general, a radio delivers power to an antenna and the impedance of the radio (and transmission line) should be well matched to the antenna's impedance. Voltage Standing Wave Ratio (VSWR) is a measure that numerically describes how well the antenna is matched to the radio that it is connected to. VSWR is a function of a reflection coefficient (also referred to as $S_{11}$ or return loss), which describes the power reflected from the antenna. The VSWR is a real and positive number and the smaller the VSWR is, the better the impedance matching of the radio and antenna is, as more power is delivered to the antenna instead of reflected. The minimum VSWR is 1.0 (also noted as VSWR 1:1) and occurs when no power is reflected from the antenna, which is ideal. When VSWR is greater than 1.0 (such as VSWR 2:1, 3:1, 4:1, and so forth), the reflected voltage wave creates standing waves along the transmission line. In one embodiment, the power detector circuit can be used to measure VSWR to determine if the impedance of the antenna and the radio are mismatched, such as illustrated in FIG. 2. Isolation achieved through AIC cancellation relies on well matched loss, group delay and on a 180 degree phase differential between the antennas coupled path and the cancellation path. As such, the AIC isolation will change with environment and will, especially be sensitive to antenna impedance changes, as seen at the AIC coupler ports as shown in FIG. 2 and the following Table 1:

TABLE 1

| | AIC isolation [dB] | Degradation with respect to VSWR 1:1 |
|---|---|---|
| VSWR 1:1 | −58.2 | 0 |
| VSWR 2:1 | −33.5 | 24.7 |
| VSWR 3:1 | −27.4 | 30.8 |
| VSWR 4:1 | −24.3 | 33.9 |

FIG. 2 is a graph 200 illustrating variability of AIC isolation in mismatched antennas according to one embodiment. The graph 200 shows AIC degradation when the antenna is presented with a first load 202 of VSWR 1:1 (ideal), a second load 204 of VSWR 2:1, a third load 206 of VSWR 3:1, and a fourth load 208 of VSWR 4:1. AID degradation can be shown when the antenna is presented loads other than VSWR 1:1. The various signals represent variable phases in steps of 60 degrees, at the AIC coupler ports, for a given VSWR other than 1:1. The AIC isolation variability with load phase becomes apparent. The loads are presented at a temperature of 25° C. As described below, the AIC isolation is dependent on temperature of the RFFE circuitry (e.g., integrated circuit having the impedance compensation circuit) in the cancelation path between the radios.

Figure 3:
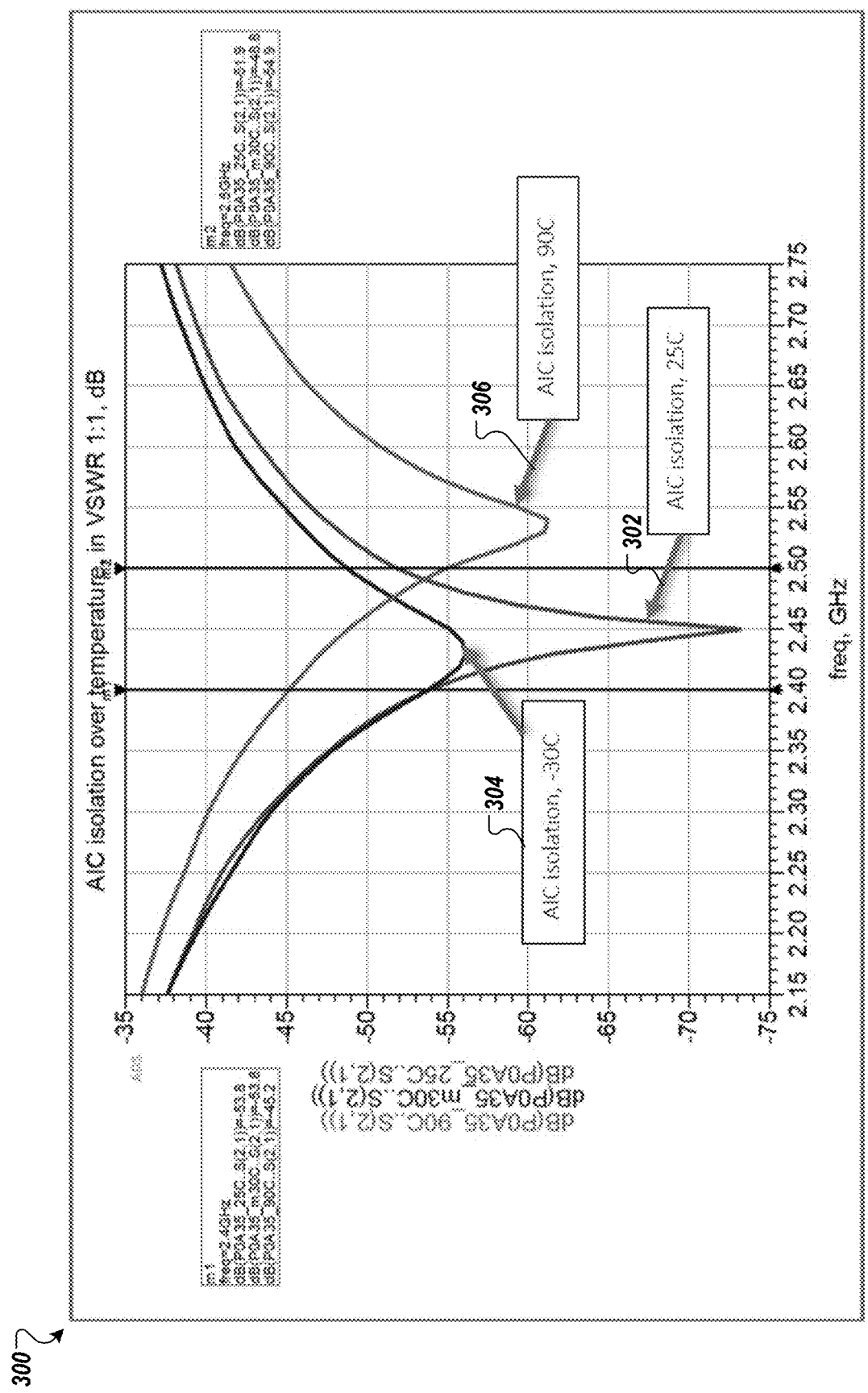
FIG. 3 is a graph illustrating variability of AIC isolation over temperature according to one embodiment.

FIG. 3 is a graph 300 illustrating variability of AIC isolation over temperature according to one embodiment. The graph 300 shows the effect on AIC isolation over different temperatures, including AIC isolation 302 at 25° C., AIC isolation 304 at −30° C., and AIC isolation 306 at 90° C. The graph 300 shows the AIC degradation over extreme temperatures (−30° C. and 90° C.) when antennas maintain a matched load condition (VSWR of 1:1). Table 2 shows the variability over temperature as well. As shown in FIG. 2, AIC isolation averaged in a 100 MHz range between 2.4 GHz to 2.5 GHz, with a resolution bandwidth of 10 MHz, for matched antenna loads at temperatures of −30° C., 25° C., and 90° C.

TABLE 2

|  | AIC isolation [dB] VSWR 1:1 | Degradation with respect to 25° C. |
| --- | --- | --- |
| 25° C. | −57.8 | 0 |
| −30° C. | −53 | 4.8 |
| 90° C. | −48.8 | 9 |

In sum, the AIC isolation for a calibrated loss and phase will degrade over temperature, up to 9 dB. However, the AIC performance degradation is dependent of changes in the antenna impedance, e.g. from a matched load condition, VSWR 1:1, to an unmatched load condition, VSWR 2:1, the loss in isolation will be approximately 25 dB. In some embodiments, a power detector circuit (and corresponding method) can be used to detect changes in the antenna's VSWR and trigger a new AIC calibration, such to regain optimum isolation, as described in more detail with respect to FIG. 4. For example, to maintain a high AIC isolation, the power detector circuit can detect changes in the impedance presented by the antennas at the AIC coupler ports (first RF coupler 102 and second RF coupler 106). This can be achieved, in one embodiment, by adding power detection capability in an integrated circuit comprising the interference compensation circuit 116 (e.g., circuit die of the attenuator/phase shifter). The power detection can be performed at a port coupled to the WLAN antenna 150, as illustrated in FIG. 4. The reflected wave can be measured to a direct current (DC) and digitized with ADC. The ADC may be the general-purpose ADC available on the second radio 140 (e.g., ZigBee® integrated circuit). Alternatively, the ADC may be an ADC available in the WLAN radio 130, the processing device 120, or another circuit of the electronic device. The ADC generates resulting codes (i.e., digital values) based on the reflected wave measurements. The resulting codes can be feed into the AIC algorithm and trigger re-calibration to recover highest isolation for a given antenna environment. Changes in impedance create significant voltage variations on the antenna coupler port that are ultimately sampled, digitized, and feed back into the AIC algorithm 122.

FIG. 4 is a block diagram of RFFE circuitry 400 for AIC according to another embodiment. The RFFE circuitry 400 may reside in an electronic device 10 as described above with respect to FIG. 1. The components of the electronic device 10 in FIG. 4 are similar to the components of the electronic device 10 in FIG. 1 as noted by similar reference numbers except where explicitly described otherwise. The RFFE circuitry 400 is similar to RFFE circuitry 100 as noted by similar reference labels. In addition to having the fixed delay filter 108 and the interference compensation circuit 116 (multi-bit digital attenuator and multi-bit phase shifter circuits) disposed on the on the cancellation path 135 between the first RF coupler 102 and the second RF coupler 106, the RFFE circuitry 400 includes a power detector circuit 402 that is coupled to the first RF coupler 102 to measure a power at a port of the first RF coupler 102. The power can be measured as the voltage at the port. The voltage measured at the port can be indicative of a VSWR of the WLAN antenna 150 as a way to measure any impedance mismatch between the WLAN radio 130 and the WLAN antenna 150.

In one embodiment, the power detector circuit 402 measures voltage values at the first RF coupler 102 and provides digital values, corresponding to the voltage values, to the processing device 120. The digital values are indicative of impedances of the WLAN antenna 150. These digital values can be used to detect a change in the impedance or an impedance mismatch that could affect the AIC algorithm 122. The AIC algorithm 122 controls the interference compensation circuit 116 to adjust the phase, the amplitude or both of the copy of the first RF signal to remove corresponding interference in a second RF signal received at the PAN antenna 154, the interference being caused by the first RF signal. The processing device 120 triggers a re-calibration in the AIC algorithm 122 when the digital values, received from the power detector circuit 402, indicate a change in impedance that exceeds a threshold value. Alternatively, the power detector circuit 402 can output a signal to the processing device 120 or the AIC algorithm 122 that indicates that the impedance mismatch necessitates a re-calibration. The re-calibration may adjust parameters of the interference compensation circuit 116 to adjust the phase, amplitude, or both of the copy of the first RF signal to remove the corresponding interference as described herein. In another embodiment, the power detector circuit 402 measures one or more analog values corresponding to a transmit power of the RF signal at the WLAN antenna 150. The power detector circuit 402 converts the analog value(s) to one or more digital values. The digital values (also referred to as the resulting codes of the VSWR measurements) can be used to determine whether the AIC algorithm 122 needs to be recalibrated for a new antenna environment that has caused the impedance mismatch.

In another embodiment, the interference compensation circuit 116 includes a multi-bit digital attenuator that adjusts an amplitude of an RF signal from the WLAN radio 130 and a multi-bit phase shifter circuit that adjusts a phase of the RF signal from the WLAN radio 130. The AIC algorithm 122 controls the interference compensation circuit to adjust the phase, the amplitude or both of the RF signal from the WLAN radio 130 and the power detector circuit 402 determines whether the AIC algorithm 122 needs to be re-calibrated because of an impedance mismatch. The power detector circuit 402 can provide the digital values as feedback to the AIC algorithm 122 itself so the AIC algorithm 122 can determine whether to re-calibrate and/or when to re-calibrate. For example, the AIC algorithm re-calibrates when the feedback indicates that a change in impedance exceeds a threshold value or re-calibrates when the impedance of the WLAN changes beyond a threshold value. In another embodiment, the power detector circuit 402 can provide the digital values as feedback to another routine or other circuit in the processing device 120 that can cause the AIC algorithm 122 to re-calibrate.

The power detector circuit 402 can include a load resistor 404 coupled between the first RF coupler 102 and ground, a diode 406 coupled to the load resister 404, and an ADC 408 coupled to the diode 406 and the processing device 120. In another embodiment, instead of the diode 406, the power detector circuit 402 can use any non-linear semiconductor device to provide a DC output from the RF signal. For example, the non-linear nature of CMOS transistor junctions can be used to achieve the same functionality as the diode 406. In another embodiment, a rectifier can be used to measure the DC voltage of the aggressor signal. In another embodiment, a FET can be used to achieve the same functionality as the diode 406. The ADC 408 converts analog voltage values to digital voltage values and provides the digital voltage values as feedback to the AIC algorithm 122 (or the processing device 120). The ADC 408 can include an input coupled to the diode 406 and an output coupled to the processing device 120. Alternatively, the ADC 408 can be part of the PAN radio 140. In this case, the PAN radio 140 can include an input that is coupled to the RFFE circuitry 400 to connect to the diode 406 and an output that is coupled to the processing device. The ADC 408 can output the digital values on the output to provide the feedback to the AIC algorithm 122. In another embodiment, the ADC 408 is part of the WLAN radio 130. In another embodiment, the ADC 408 is part of the RFFE circuitry 400, or even a standalone component in the electronic device 10.

As described above, the first fixed-delay filter 108 of the RFFE circuitry 400 can be set to match a delay in the cancellation path 135 to a propagation delay in the antenna path 151 between the WLAN antenna 150 and the PAN antenna 154. The fixed-delay filter 108 may include one or more lumped elements disposed in one or more paths and these paths can be added to or removed from the cancelation path 135 to result in different delays.

In one embodiment, the interference compensation circuit 116 applies a variable gain and a variable phase shift to generate any amplitude and phase. The AIC algorithm 122 can control the interface 124 to set the amplitude and phase, respectively. A multi-bit digital attenuator of the interference compensation circuit 116 can receive a voltage level or digital voltage or code from interface 124 to set the amplitude setting in device 116. Accordingly the multi-bit phase shifter part of 116 will similarly be set by applying voltage level or digital voltage or code from interface 124. In another embodiment, the AIC algorithm 122 can send a digital code or a signal with multiple bits to set the multi-bit digital attenuator to set the magnitude of I. Similarly, a phase shifter can receive a signal or code form the PWM 124 or AIC algorithm to set the phase of the copy of the RF signal received from the WLAN radio via the first RF coupler 102. The interference compensation circuit 116 can adjust the phase and amplitude of the RF signal in the cancellation path 135.

The embodiments of the electronic devices 10 of FIGS. 1 and 4 are single-input-single-output (SISO) WLAN and PAN antenna system with AIC. The embodiments described herein regarding AIC can also be implemented in multiple-input-multiple-output (MIMO) WLAN and PAN antenna system.

In another embodiment, the RFFE circuitry is coupled to a processing device and the RFFE circuitry includes a first RF coupler, a second RF coupler, an interference compensation circuit, and a power detector circuit. The first RF coupler is coupled between a first antenna and a first transceiver in a transmit path, the first RF coupler to create a copy of a first RF signal transmitted via the first antenna. The second RF coupler is coupled between a second antenna and a second transceiver in a receive path. The second antenna receives a second RF signal. The second RF signal includes interference caused by the first RF signal transmitted via the first antenna. The interference compensation circuit is part of an electrical path between the first RF coupler and the second RF coupler. The processing device controls the interference compensation circuit to adjust a phase, an amplitude or both of the copy of the first RF signal to generate a third RF signal. The second RF coupler adds the third RF signal to the second RF signal received via the second antenna, removing the interference caused by the first RF signal transmitted via the first antenna. The power detector circuit is coupled to the first RF coupler and detects a change in impedance of the WLAN antenna.

In a further embodiment, a fixed-delay filter is coupled to the first RF coupler and the interference compensation circuit. In one embodiment, the interference compensation circuit includes a multi-bit digital attenuator to adjust the amplitude of the first RF signal and a multi-bit phase shifter circuit to adjust the phase of the first RF signal.

In one embodiment, the power detector circuit includes a resistor coupled between the first RF coupler and ground, a diode coupled to the resistor, and ADC coupled to the diode and the processing device. The ADC converts analog voltage values to digital voltage values and provides the digital voltage values as feedback to the processing device.

In one embodiment, an integrated circuit die includes the first RF coupler, the second RF coupler, the interference compensation circuit, and the diode, and the ADC resides in the second radio. In another embodiment, the integrated circuit die includes the first RF coupler, the second RF coupler, the interference compensation circuit, and the diode, and the ADC resides in the first radio. In another embodiment, the integrated circuit die includes the first RF coupler, the second RF coupler, the interference compensation circuit, and the diode, and the ADC resides in the processing device. In another embodiment, the integrated circuit die includes the first RF coupler, the second RF coupler, the interference compensation circuit, the diode, and the ADC.

As described herein, the first transceiver and the second transceiver operate in a same frequency spectrum concurrently without time-switching. For example, the first transceiver and the second transceiver operate concurrently in the 2.4 GHz ISM radio band. In another embodiment, the first transceiver is at least one of a WLAN transceiver, a wireless WAN transceiver, a PAN transceiver, or the like, and the second transceiver is at least one of a WLAN transceiver, a wireless WAN transceiver, or a PAN transceiver. Alternatively, individual transmitters and receivers may be used.

In another embodiment, the processing device executes the AIC algorithm to control parameters of the interference compensation circuit to adjust the phase, the amplitude or both of the copy of the first RF signal to generate the third RF signal. The power detector circuit, to detect the change in impedance, measures voltage values at the first RF coupler and provides digital values, corresponding to the voltage values, to the processing device. The digital values are indicative of impedances of the WLAN antenna. The processing device triggers a re-calibration of the parameters of the interference compensation circuit when the digital values, received from the power detector circuit, indicate a change in impedance that exceeds a threshold value. The change in impedance can be caused from the device changing from a first antenna environment to a second antenna environment. For example, when the first radio and the second radio operate in a first antenna environment, the first radio and the first antenna can be matched. When the first radio and the second radio operate in a second antenna environment that is different than the first antenna environment, the first radio and the first antenna may become mismatched. In this case, the power detector circuit can detect the change in impedance and trigger re-calibration in the AIC algorithm.

It should be noted that although various embodiments describe two wireless radios, in other embodiments, the aggressor can be another source of interference, such as a microwave oven. The interference received at a wireless radio, the interference being caused by the microwave oven, can be removed from RF signals being received at a receiver of the wireless radio. The frequency of other sources may cause interference in frequency ranges that are unregulated or loosely regulated. The periodic signals from these sources may have high enough power to affect the radio. The interference compensation circuit, as described herein, can be disposed between any signal source and a receiver to remove interference from the RF signals received by the receiver. In another embodiment, the aggressor is a microwave oven magnetron and the victim radio is a WLAN or PAN radio.

Figure 5:
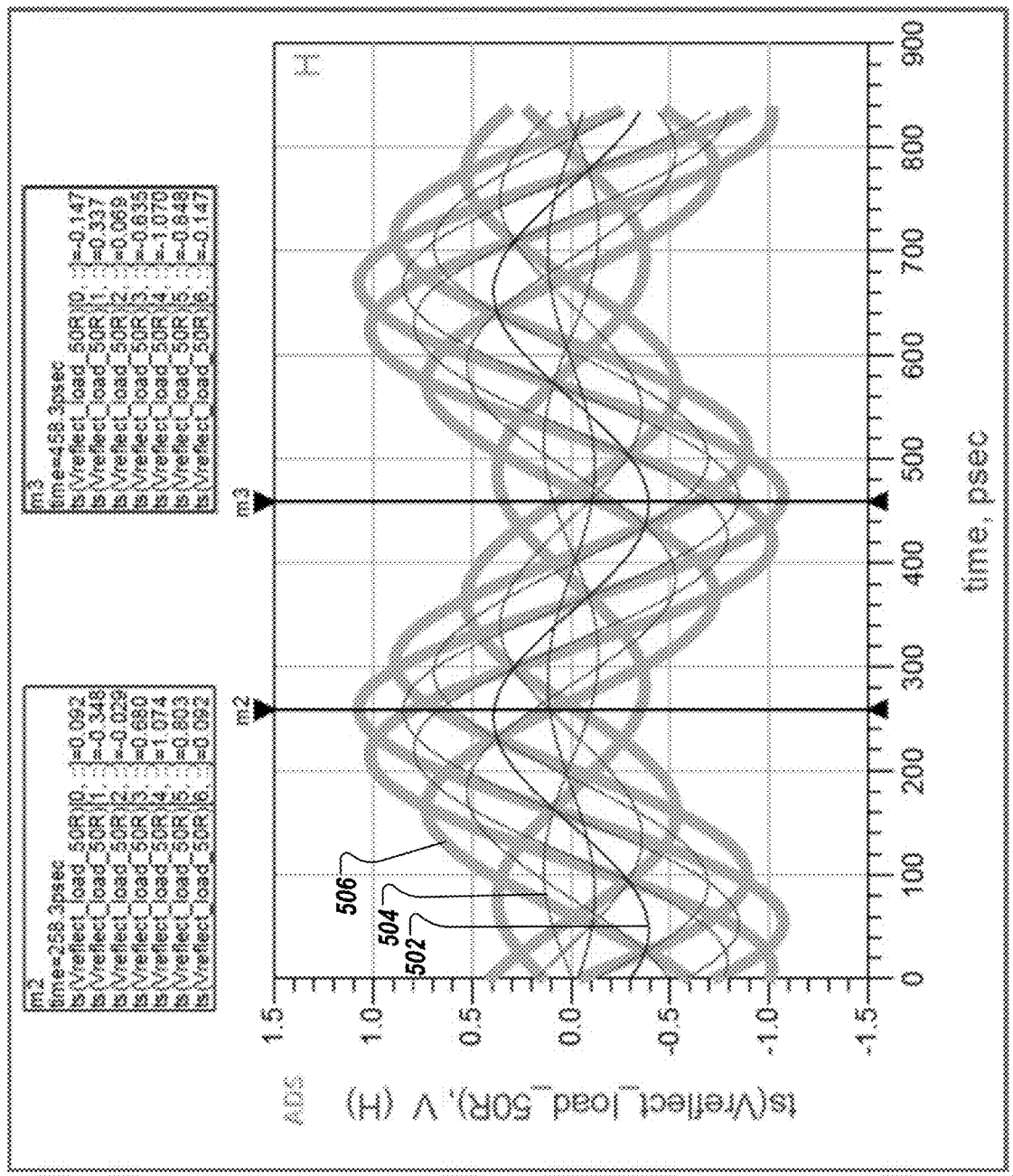
FIG. 5 is a graph illustrating that reflected waves from a mismatched antenna generate significant voltages on a resistive load according to one embodiment.

FIG. 5 is a graph 500 illustrating that reflected waves from a mismatched antenna generate significant voltages on a resistive load according to one embodiment. As shown in the graph 500, when a WLAN transceiver applies a 20 dBM CW tone to an antenna port with an expected 50Ω load (VSWR 1:1 load), a voltage signal 502 is detected at a coupler port. When the same tone is applied to the antenna port with a mismatched load with VWSR 2:1, a voltage signal 504 is detected at the coupler port. When the same tone is applied to the antenna port with a mismatched load with VWSR 3:1, a voltage signal 506 is detected at the coupler port. FIG. 5 also shows the voltage signals when the phase changes in 60 degree steps. The graph 500 shows that the reflected wave from the mismatched antenna generates a significant voltage on the 50Ω load (this is load expected for the power detector circuit). For example, the VSWR 3:1 creates a peak-to-valley RF voltage variation of 2V. Changes in phase for a fixed antenna return loss can also be easily detected. After digitization, the codes corresponding to the antenna reflected wave can be fed back into the AIC algorithm and trigger re-calibration for the highest AIC isolation as described herein.

Figure 6A:
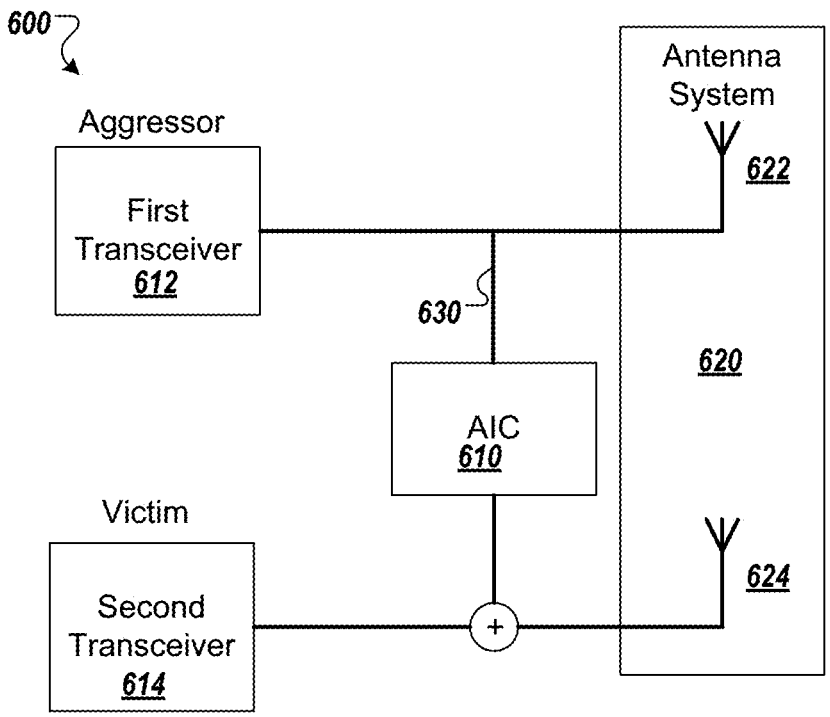
FIG. 6A is a block diagram of a single-input-single-output (SISO) wireless local area network (WLAN) and personal area network (PAN) antenna system with AIC according to one embodiment.

FIG. 6A is a block diagram of a SISO WLAN and PAN antenna system 600 with AIC tool 610 according to one embodiment. The SISO WLAN and PAN antenna system 600 may be employed in a digital media player and micro-console, a set-top box (STB), or other electronic device. The SISO WLAN and PAN antenna system 600 includes an antenna system 620 with a first antenna 622 and a second antenna 624. A first transceiver 612 is operable to radiate electromagnetic energy via the first antenna 622 and a second transceiver 614 is operable to radiate electromagnetic energy via the second antenna 624. An AIC tool 610 is disposed along a cancellation path 630 between the first antenna 622 and the second antenna 624. The AIC tool 610 is a simple representation of the RFFE circuitry and the AIC algorithm described above with respect to FIGS. 1-5. The AIC tool 610 addresses the radio interference challenges when the two antennas are operating in the same frequency spectrum. Although not illustrated in FIG. 6A, the AIC tool 610 can include the power detector circuit described herein to detect changes in impedance of the antenna and to re-calibrate the AIC algorithm when necessary.

In this embodiment, the first transceiver 612 is considered the aggressor and the second transceiver is considered the victim. In this architecture, both the first transceiver and the second transceiver can transmit and receive simultaneously. However, since both transceivers are on at the same time, the aggressor's transmit signal will present itself as unwanted signal at the victim's transceiver, causing interference. Because of this interference, the operable range could be reduced without the use of the AIC tool 610. For example, to maximize the operable range, an isolation of at least 60 dB is desired between the two transceivers. Since the antennas are disposed in a compact consumer electronic, the AIC tool can be used to mitigate interference in simultaneous operation architecture. This reduction in interference as a result of the AIC tool 610 is illustrated in FIG. 6B.

Figure 6B:
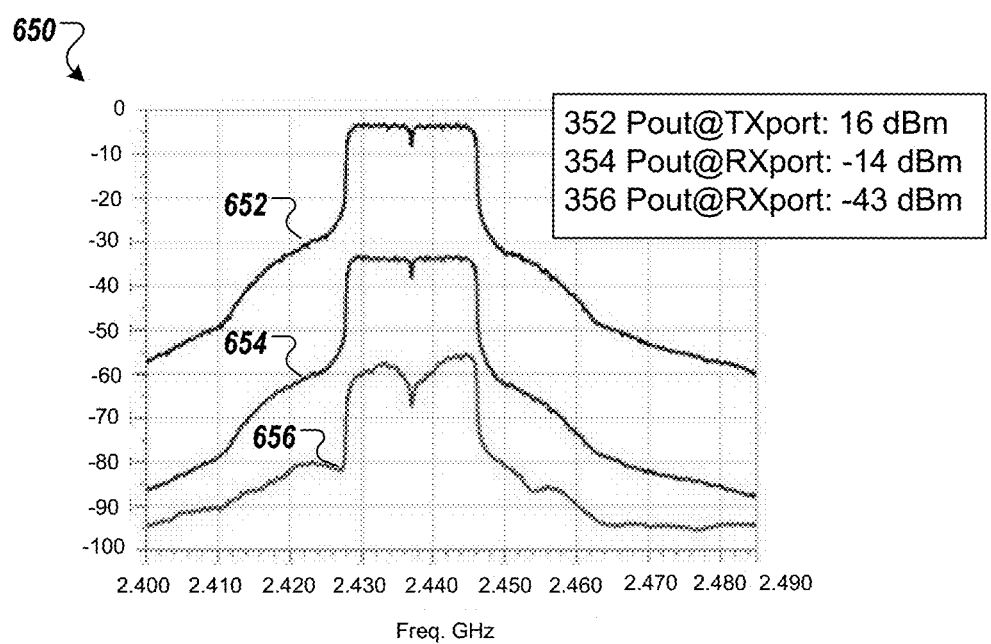
FIG. 6B is a graph of the power spectrum density of the antenna system of FIG. 6A with AIC and without AIC according to one embodiment.

FIG. 6B is a graph 650 of the power spectrum density of the antenna system 600 of FIG. 6A with AIC tool 610 and without AIC tool 610 according to one embodiment. The graph 650 illustrates the power spectrum density at the TX and RX ports between 2.4 GHz and 2.49 GHz. In particular, the graph 650 illustrates the power spectrum density at a TX port of the first transceiver 612. The power is 16 dBm at the TX port. The graph 650 also illustrates the power spectrum density at a RX port of the second transceiver 614 without using AIC tool 610. The power is −14 dBm at the RX port without using AIC tool 610. The graph 650 also illustrates the power spectrum density at a RX port of the second transceiver 614 using AIC tool 610. The power is −43 dBm at the RX port using AIC tool 610.

Embodiments of the AIC make use of the fact that the electronic device knows exactly what the aggressor radio is transmitting. By copying the aggressor transmit signal, manipulating the delay, amplitude, and phase of the copied signal, AIC can present a signal equal in amplitude but 180° out of phase to the signal that normally shows up at the victim receiver through the antenna coupling. When these two signals are added together in the victim's receiver chain, the aggressor signal will be removed due to destructive interference. At the heart of AIC implementation is an interference compensation circuit, which is used to adjust the amplitude and phase of the copied signal. As described herein, the AIC implementation can be enhanced by detecting changes in impedances and re-calibrating the AIC algorithm when necessary.

As illustrated in FIG. 6B, the benefit of AIC is shown in a lab experiment with a spectrum analysis in the place of the second transceiver 614 proven in lab experiments. In the first experiment, AIC impact on total isolation from aggressor transmitter to victim receiver is explored. The experiment was performed with Single Input Single Output (SISO) WLAN as aggressor, as illustrated in FIG. 6A. The antenna system 620 of a digital media player and microconsole was used to simulate achievable isolation between two antennas in an existing product. FIG. 6B illustrates the difference in aggressor transmit power at the input of victim receiver (curve 656) with AIC tool 610 and at the input of the victim receiver (curve 654) without AIC. The results showed an improvement of total isolation from approximately 22 dB to over approximately 59 dB.

Figure 7A:
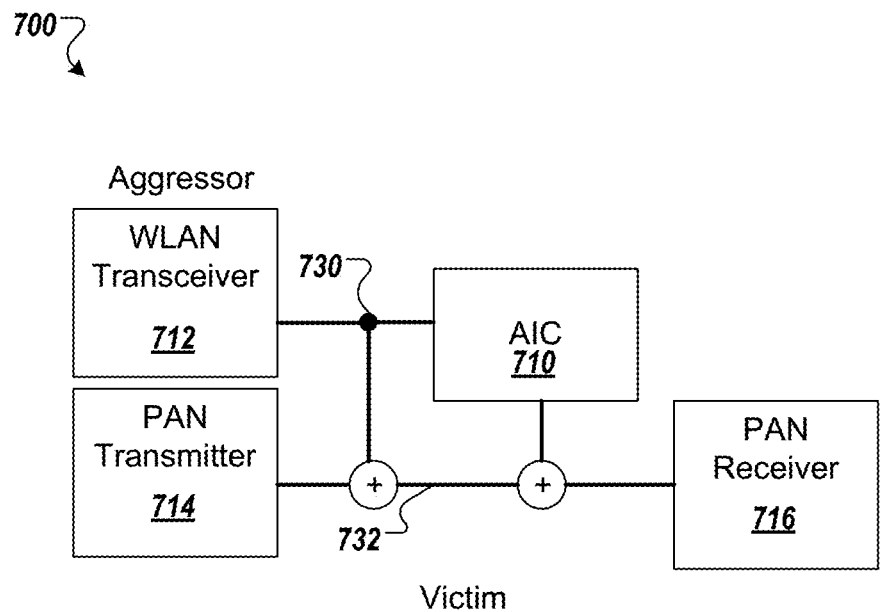
FIG. 7A is a block diagram illustrating topology of a SISO WLAN and PAN antenna system according to one embodiment.

FIG. 7A is a block diagram illustrating topology of a SISO WLAN and PAN antenna system 700 with AIC tool 710 according to one embodiment. The SISO WLAN and PAN antenna system 700 may be employed in a digital media player and micro-console, a set-top box (STB), or other electronic device. The SISO WLAN and PAN antenna system 700 includes a WLAN transceiver 712 that is considered the aggressor, a PAN transmitter 714 and PAN receiver that is considered the victim. An AIC tool 710 is disposed along a cancellation path 730 between the WLAN transceiver 712 and the PAN receiver 716. The AIC tool 710 is a simple representation of the RFFE circuitry and the AIC algorithm described above with respect to FIGS. 1-5. The AIC tool 710 addresses the radio interference challenges when the two antennas are operating in the same frequency spectrum.

In this embodiment, the WLAN transceiver 712 is considered the aggressor and the PAN receiver 716 is considered the victim. In this architecture, both the WLAN transceiver 712 and the PAN receiver 716 can transmit and receive concurrently. However, since both the WLAN transceiver 712 and the PAN receiver 716 are on at the same time, the aggressor's transmit signal will present itself as unwanted signal at the victim's receiver, causing interference. Because of this interference, the operable range could be reduced without the use of the AIC tool 710. For example, to maximize the operable range, an isolation of at least 60 dB is desired between the WLAN transceiver 712 and the PAN receiver 716. Since the antennas are disposed in a compact consumer electronic, the AIC tool 710 can be used to mitigate interference in simultaneous operation architecture. This reduction in interference as a result of the AIC tool 710 is illustrated in FIG. 7B.

Figure 7B:
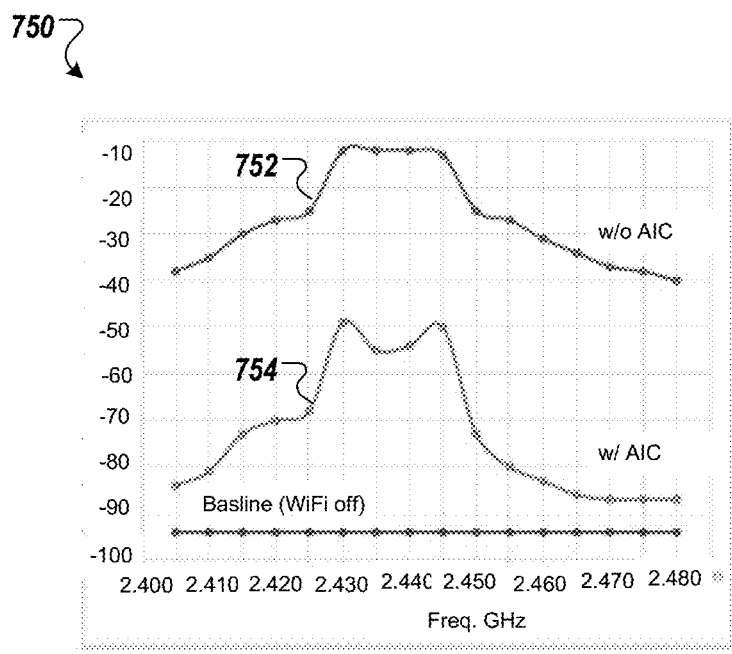
FIG. 7B is a graph of the PAN receiver sensitivity of the system of FIG. 7A according to one embodiment.

FIG. 7B is a graph 750 of the PAN receiver sensitivity of the system 700 of FIG. 7A with AIC tool 710 and without AIC tool 710 according to one embodiment. The graph 750 illustrates the power spectrum density at the reference point 732 in FIG. 7A. In particular, the graph 750 illustrates the power spectrum density 752 when not using AIC tool 710 in the cancellation path 730 and the power spectrum density 754 when using AIC tool 710 in the cancellation path 730.

In a second experiment, AIC impact on system level improvement is validated as shown in FIG. 7B. As shown in FIG. 7A, the experiment was tested with the SISO WLAN as aggressor and PAN as victim, and PAN reference sensitivity level was measured with and without AIC. With −14 dBm WLAN TX power at the reference point 732, which simulates an antenna isolation of 30 dB, there would be over 50 dB de-sense without AIC. By activating AIC, de-sense was reduced to less than 10 dB in the non-overlapping edge channels (channel 11 and channel 24, 25, 26).

FIG. 8A is a block diagram of a conventional time-switched and Packet Traffic Arbitration (PTA) co-existence radio architecture. As described above, for conventional multi-user multiple-input multiple-output (MU-MIMO) antenna system, multiple antennas are needed to achieve data rates up to several Gbits/s. The conventional antennas need to be separated in space or in time. In compact electronic devices, space may not be feasible, so these conventional radio architectures use time-switched architectures. For example, as illustrated in FIG. 8A, an application processor may interface with a WLAN transceiver and a PAN antenna. In order to permit both WLAN radio and the PAN radio to operate in the same frequency, one antenna may be used, but a switch is needed to switch the antenna between the WLAN radio and the PAN radio in turn. That is both WLAN radio and the PAN radio cannot operate concurrently or simultaneously. Typically, a co-existence interface is coupled between the WLAN radio and the PAN radio to share the use of the switch and antenna.

To operate multiple radios in the same band, e.g., 2.4 GHz ISM band, within the same device in simultaneous or concurrent operations, embodiments of the Active Interference Cancellation can be used to address the radio interference challenges as illustrated and described with respect to FIGS. 1-7B. For example, the diagram in FIG. 1 illustrates an implementation where there the SISO WLAN radio (e.g., Wi-Fi® technology) is the aggressor and the PAN radio (e.g., Bluetooth® technology or Zigbee® technology) is the victim.

Figure 8B:
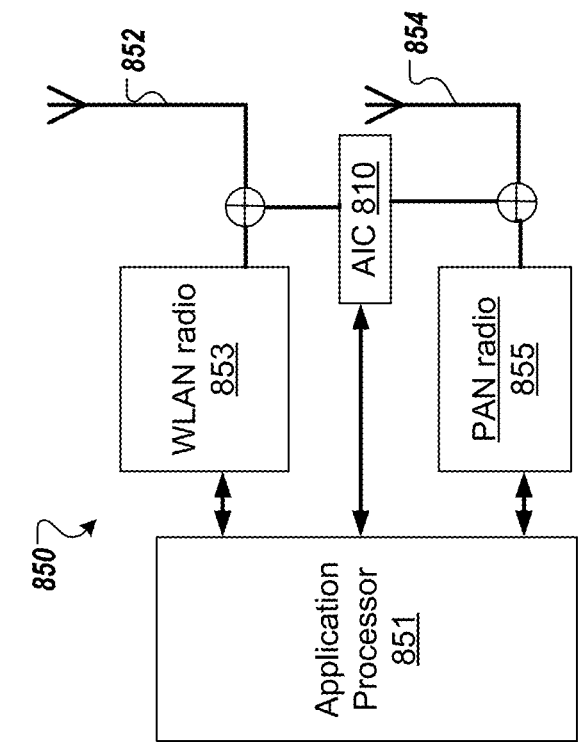
FIG. 8B is a block diagram of a radio architecture for simultaneous operation using AIC according to a conventional solution.
Figure 8A:
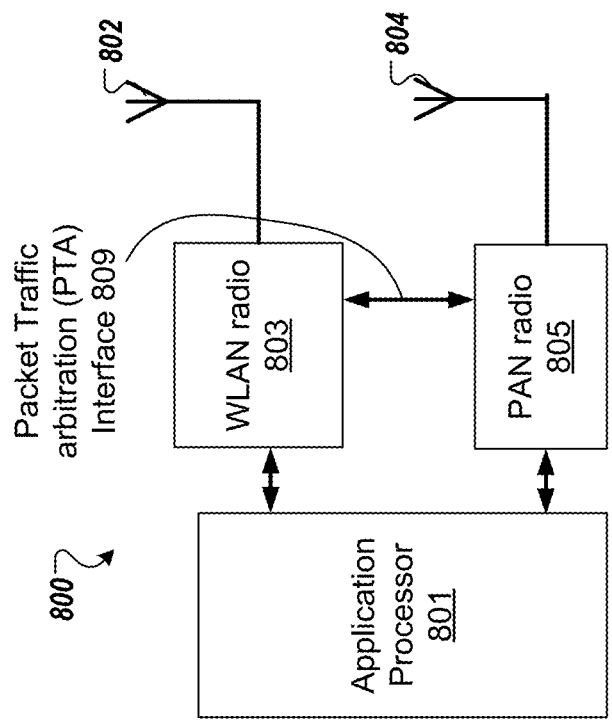
FIG. 8A is a block diagram of a conventional time-switched and Packet Traffic Arbitration (PTA) co-existence radio architecture.

FIG. 8B is a block diagram of a radio architecture for simultaneous operation using AIC according to a conventional solution. An application processor may interface with a WLAN transceiver and a PAN antenna. In order to permit both WLAN radio and the PAN radio to operate in the same frequency, AIC 810 is used to remove the interference between the two antenna 852 and corresponding RF radios. This simultaneous operation radio architecture does not need a switch or time-switch operations of the WLAN radio and the PAN radio, as done conventionally. That is both WLAN radio and the PAN radio can operate concurrently or simultaneously. Although not illustrated in FIG. 8B, the AIC 810 can include the power detector circuit described herein to detect changes in impedance of the antenna and to re-calibrate the AIC algorithm when necessary.

In one embodiment, a processing device executes an AIC algorithm as described herein. RFFE circuitry is coupled to the processing device and includes the following: a first RF coupler coupled between a first antenna and a first transceiver in a transmit path; a second RF coupler coupled between a second antenna and a second transceiver in a receive path; a cancellation path coupled between the first RF coupler and the second RF coupler; a fixed-delay filter disposed along the cancellation path between the first RF coupler and the second RF coupler; and an interference compensation circuit disposed along the cancellation path between the first RF coupler and the second RF coupler. The AIC algorithm is operable to control the fixed-delay filter to match a delay in the cancellation path to a propagation delay in an antenna path. The AIC algorithm is operable to control the interference compensation circuit to adjust a phase, an amplitude or both of a copy of a first RF signal transmitted via the first antenna to generate a second RF signal. The second RF signal is added to a third RF signal via the second RF coupler to remove from the third RF signal interference caused by the first RF signal. This is done using destructive interference. In some embodiments, the first transceiver and the second transceiver operate in a same frequency spectrum concurrently without time-switching. In other embodiments, the first transceiver and the second transceiver operate in concurrently in the 2.4 GHz ISM radio band. In another embodiment, one transceiver operates in the 2.4 GHz ISM band and the other operates in an LTE bands B7/B30/B41 at 2.5 GHz-2.57 GHz, which is very close to the 2.4 GHz ISM bands.

The following description is directed to software features that can be implemented in a processing device, such as an Application Processor (AP) to support AIC. That is, the AIC algorithm can be used to control the RFFE with AIC features described above. In particular, the processing device includes one or more of the following software features:

1. Adaptive algorithm to optimize AIC control parameters using a search algorithm described with respect to FIGS. 6-9B.

2. An interface between processing device and a first RF chipset to communicate the status of the first RF chip set, like if TX is active, channel at which TX is operating, MCS, or the like.

3. An interface between processing device and second RF chipset to communicate the status of the second RF chipset, such as ZigBee/BLE chipset, and/or measurements like RSSI, SNR, or the like.

4. An interface definition to control interference compensation circuit during AIC.

5. GPIO control to support various switch configurations.

It should be noted that the implementation are not restricted to the components as shown. For example, a dedicated microcontroller or DAC pins can also be used in place of AP, creating a standalone AIC implementation. For another example, the couplers can be replaced with combiner/divider or balun. It should also be noted that the radios do not need to be restricted to 2.4 GHz ISM band radios. AIC can be extended to any radios working simultaneously within a device and causes interference to each other. For example, LTE B7/B30/B41 transmits at 2.5 GHz-2.57 GHz, which is very close to the 2.4 GHz ISM bands. In one embodiment, the first transceiver is a wide area network (WAN) radio and the second transceiver is a PAN or WLAN radio. For example, some WAN radios may operate in 800 MHz and 900 MHz ISM bands, such as LTE B5/B7 and the PAN radio may operate in 900 MHz ISM band. Alternatively, other combination of radio technologies may be implemented and the AIC can be used to remove interference at the victim radio caused by the aggressor radio. As noted herein, the interference has conventionally been handled by using high cost filters, power back off, and/or time division between the radios. These items result in added cost, reduce range, and lowered throughput. These shortcomings may be addressed by applying AIC, such as in a setup where LTE B7/B30/B41 is the aggressor and 2.4 GHz ISM band radio is the victim.

Since aggressor transmit signal that coupled to the victim receive chain through the antennas varies greatly based on the environment, the AIC implementation must be able to optimize itself to identify the amplitude and phase setting of the copied path. In order to provide the maximum cancellation, the AIC algorithm can be used to determine and apply the amplitude, phase, and delay parameters of the RFFE. One embodiment is set forth in the flow diagram of FIG. 9.

Figure 9:
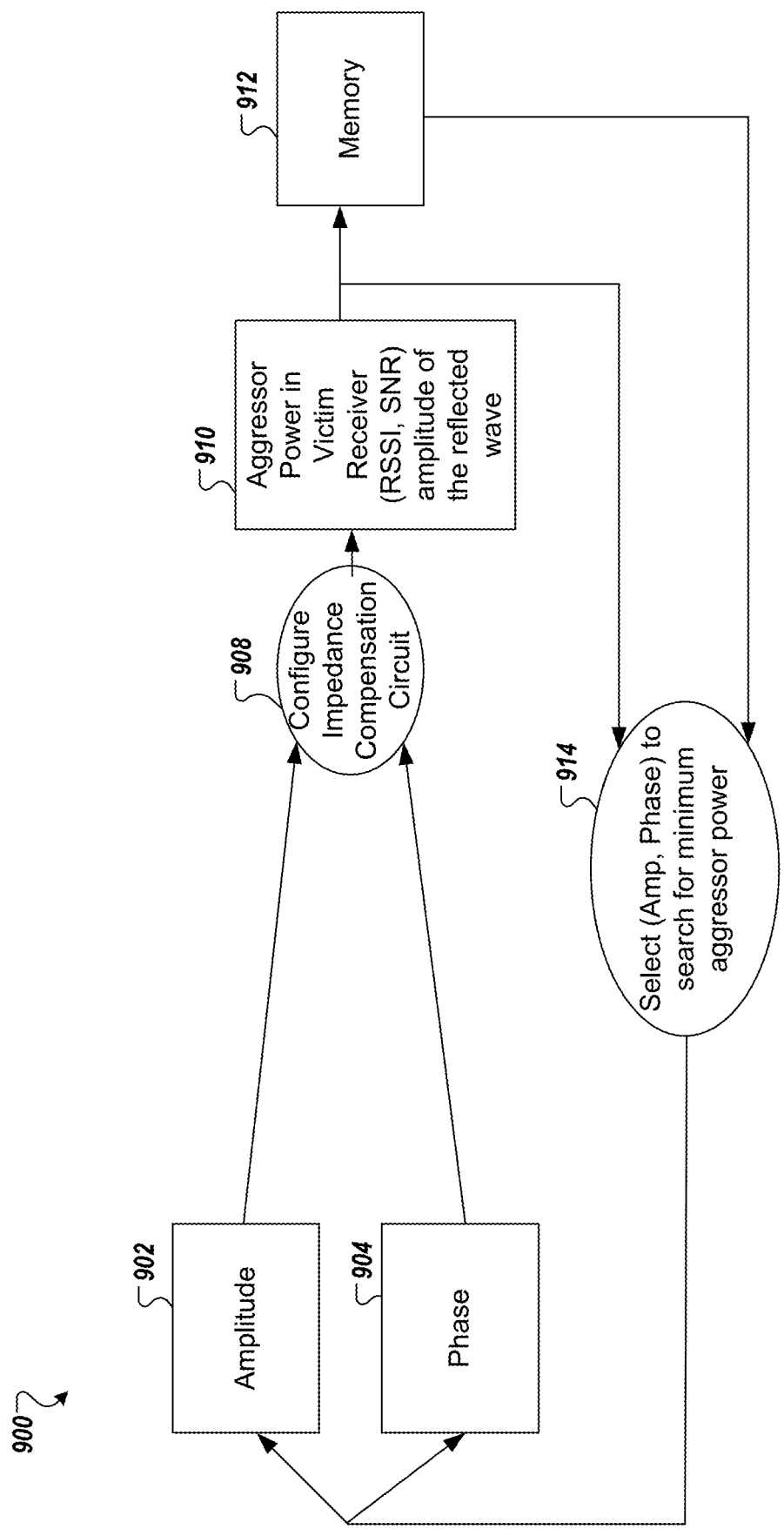
FIG. 9 is a flow diagram of an AIC algorithm to determine amplitude and phase of a signal for cancellation according to one embodiment.

FIG. 9 is a flow diagram of an AIC algorithm 900 to determine amplitude and phase of a signal for cancellation according to one embodiment. AIC algorithm 900 may be implemented using processing logic comprising hardware, software, firmware, or any combination thereof. In one embodiment, the AIC algorithm 122 of FIG. 1 or FIG. 2 implements the AIC algorithm 900. As described above, the processing device can have control over the RF radios, including an aggressor RF radio and a victim RF radio. The aggressor RF radio can be set to transmit and the victim radio can be set to listen. When the amplitude and the phase of a copied signal path, such as from the RF coupler in the cancellation path, an amount of power delivered to the victim RF radio will vary. To measure the power delivered to the victim RF radio, the corresponding amplitude and phase can be set on the interference compensation.

Referring to FIG. 9, the processing logic selects an amplitude (block 902) and selects a phase (block 904). At block 908, the processing logic configures the impedance compensation circuit. At block 910, the processing logic determines an aggressor power at the victim RF radio. This may be done by the processing logic requesting a status from the victim RF radio, such as to obtain RSSI, SNR, or the like, as well as the magnitude of the reflected wave. At block 912, the processing logic stores in memory the aggressor power corresponding to the amplitude and phase, and returns to block 914 to select another amplitude and phase and the process is repeated for the possible amplitude and phase combinations. At block 914, the processing logic selects the amplitude and phase to search for a minimum aggressor power. The amplitude and phase for this minimum power can be used for a particular antenna environment. In a different antenna environment, different amplitude and phase values may be selected.

In another embodiment, the processing logic instructs a first transceiver to transmit a first radio frequency (RF) signal via a first antenna. The processing logic instructs a second transceiver to receive a second RF signal via a second antenna, the second RF signal includes interference from the first RF signal transmitted through an antenna path from the first antenna to the second antenna. The processing logic controls a first fixed-delay filter, disposed in a cancellation path between the first transceiver and the second transceiver, to match a delay in the cancellation path to a propagation delay in the antenna path. The processing logic controls a first interference compensation circuit, disposed in the cancellation path, to generate a second RF signal by adjusting a phase, an amplitude, or both of a copy of a first RF signal transmitted via the first antenna. The second RF signal is added to a third RF signal received via the second antenna to remove from the third RF signal interference caused by the first RF signal. By adding the second RF signal to the third RF signal, the second RF signal is removed due to destructive interference when the appropriate parameters are selected, including the delay of the antenna path, the phase and amplitude of the RF signal from the aggressor RF radio.

In a further embodiment, the processing logic selects a value for the first fixed-delay filter to set a first delay in the cancellation path. The processing logic determines an amplitude and a phase for the second RF signal that result in a minimum power by the third signal. The minimum power is the lowest power measured for the various adjustments to the amplitude, phase, or both of the RF signal.

In one embodiment, the processing logic searches for the amplitude and phase by setting a first amplitude value and a first phase value and supplying a voltage level to the first interference compensation circuit to generate the third RF signal with the set first amplitude value and the first phase value. In another embodiment, the processing logic generates the third RF signal having the first amplitude value and the first phase value. The processing logic measures a power of the third signal. The power may represent the power delivered to the second transceiver from the first signal transmitted via the first antenna. In one embodiment, the processing logic determines the power by receiving a report from the second transceiver, the report containing at least one of RSSI, SNR, or the like. The processing logic adjusts the first amplitude value, the first phase value, or both to find the minimum power by the third signal.

In another embodiment, the processing logic searches for the amplitude and the phase by performing various searches with different resolutions.

In another embodiment, the processing logic makes 122 only makes use of the amplitude of the reflected wave to adjust the amplitude and phase of interference compensation circuit 116, until reflected wave is minimized. Such minimum corresponds to a high AIC isolation.

In another embodiment, the processing logic instructs a first transceiver to transmit a first RF signal via a first antenna. The processing logic instructs a second transceiver to receive a second RF signal via a second antenna. The second RF signal includes interference caused by the first RF signal transmitted through an antenna path from the first antenna to the second antenna. The processing logic controls an interference compensation circuit, disposed in the electrical path, to generate a third RF signal by adjusting a phase, an amplitude or both of a copy of a first RF signal transmitted via the first antenna. The third RF signal is added to the second RF signal received via the second antenna to remove the interference from the second RF signal. The processing logic detects a change in impedance of the first antenna and calibrates parameters of the interference compensation circuit to remove the interference from subsequent RF signals received by the second antenna. In a further embodiment, the processing logic determines the amplitude and the phase for the third RF signal that result in a lowest interference in the second RF signal. In one embodiment, the processing logic determines the amplitude and phase by setting a first amplitude value and a first phase value and generating the second RF signal having the first amplitude value and the first phase value. The processing logic measures a power of the third RF signal and adjusts the first amplitude value, the first phase value, or both to find a minimum power by the third RF signal.

In one embodiment, to detect the change in impedance, the processing logic receives a digital value from a power detector circuit. The digital value is indicative of an impedance of the first antenna. The processing logic determines that the digital value exceeds a threshold value. The digital value exceeding the threshold value can operate as a trigger for the calibrating the parameters.

In another embodiment, to detect the change in impedance, the processing logic receives a digital value from an ADC of the second radio, the digital value being indicative of an impedance of the first antenna. The processing logic determines that the digital value exceeds a threshold value. The digital value exceeding the threshold value can operate as a trigger for the calibrating the parameters.

In another embodiment, to detect the change in impedance, the processing logic receives a digital value from an ADC of the first radio, the digital value being indicative of an impedance of the first antenna. The processing logic determines that the digital value exceeds a threshold value. The digital value exceeding the threshold value can operate as a trigger for the calibrating the parameters.

Figure 10:
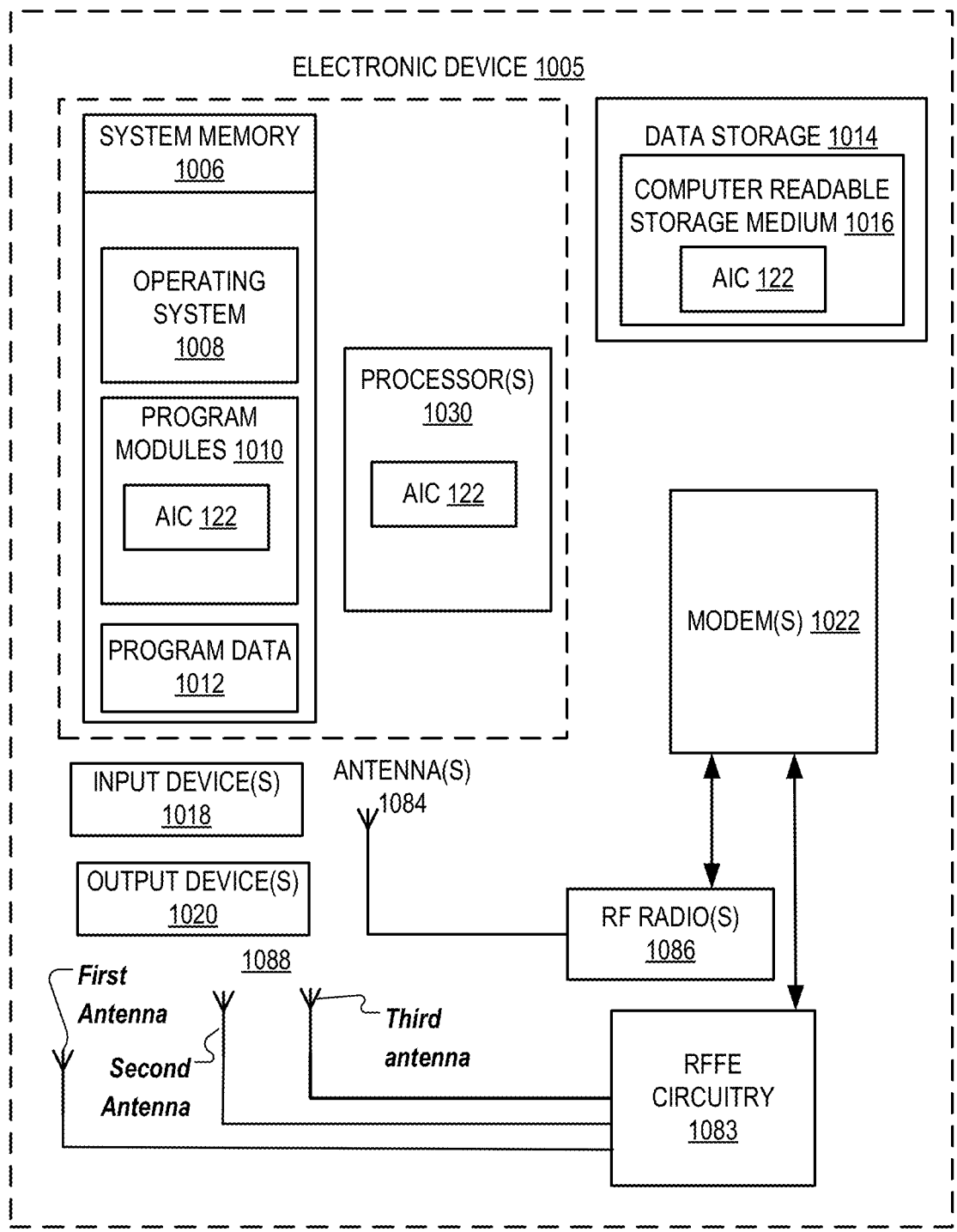
FIG. 10 is a block diagram of an electronic device in which embodiments of AIC may be implemented.

FIG. 10 is a block diagram of an electronic device 1005 in which embodiments of AIC may be implemented. The electronic device 1005 may correspond to the electronic device 10 of FIG. 1 of FIG. 1 or electronic device 10 of FIG. 2. The electronic device 1005 may be any type of computing device such as an electronic book reader, a PDA, a mobile phone, a laptop computer, a portable media player, a tablet computer, a camera, a video camera, a netbook, a desktop computer, a gaming console, a DVD player, a Bluray®, a computing pad, a media center, an audio-input-enabled device, a speech-based personal data assistant, and the like. The electronic device 1005 may be any portable or stationary user device. For example, the electronic device 1005 may be an intelligent voice control and speaker system. Alternatively, the electronic device 1005 can be any other device used in a WLAN network (e.g., Wi-Fi® network), a WAN network, or the like.

The electronic device 1005 includes one or more processor(s) 1030, such as one or more CPUs, microcontrollers, field programmable gate arrays, or other types of processing devices. The electronic device 1005 also includes system memory 1006, which may correspond to any combination of volatile and/or non-volatile storage mechanisms. The system memory 1006 stores information that provides operating system component 1008, various program modules 1010 such as the AIC 122 described herein, program data 1012, and/or other components. In one embodiment, the system memory 1006 stores instructions of the methods as described herein. The electronic device 1005 performs functions by using the processor(s) 1030 to execute instructions provided by the system memory 1006.

The electronic device 1005 also includes a data storage device 1014 that may be composed of one or more types of removable storage and/or one or more types of non-removable storage. The data storage device 1014 includes a computer-readable storage medium 1016 on which is stored one or more sets of instructions embodying any of the methodologies or functions described herein, such as the AIC 122 described herein. Instructions for the program modules 1010 may reside, completely or at least partially, within the computer-readable storage medium 1016, system memory 1006 and/or within the processor(s) 1030 during execution thereof by the electronic device 1005, the system memory 1006 and the processor(s) 1030 also constituting computer-readable media. The electronic device 1005 may also include one or more input devices 1018 (keyboard, mouse device, specialized selection keys, etc.) and one or more output devices 1020 (displays, printers, audio output mechanisms, etc.).

The electronic device 1005 further includes a modem 1022 to allow the electronic device 1005 to communicate via a wireless network (e.g., such as provided by the wireless communication system) with other computing devices, such as remote computers, an item providing system, and so forth. The modem 1022 can be connected to RFFE circuitry 1083 (including RF radios) and zero or more additional RF radios 1086. The RFFE circuitry 1083 may be a WLAN radio, a WAN radio, PAN radio, or the like, as described herein. Antennas 1088 are coupled to the RFFE circuitry 1083, which is coupled to the modem 1022. The antennas 1088 may include a first WLAN antenna and a second WLAN antenna, and PAN antenna as described herein. Zero or more antennas 1084 can be coupled to one or more RF radios 1086, which are also connected to the modem 1022. The zero or more antennas 1084 may be GPS antennas, NFC antennas, other WAN antennas, WLAN or PAN antennas, or the like. The modem 1022 allows the electronic device 1005 to handle both voice and non-voice communications (such as communications for text messages, multimedia messages, media downloads, web browsing, etc.) with a wireless communication system. The modem 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1022 may generate signals and send these signals to antennas 1088, and 1084 via RFFE circuitry 1083, and RF radio(s) 1086 as descried herein. Electronic device 1005 may additionally include a WLAN radio, a GPS receiver, a PAN transceiver, and/or other RF radios. These RF radios may additionally or alternatively be connected to one or more of antennas 1084, 1088. Antennas 1084, 1088 may be configured to transmit in different frequency bands and/or using different wireless communication protocols. The antennas 1084, 1088 may be directional, omnidirectional, or non-directional antennas. In addition to sending data, antennas 1084, 1088 may also receive data, which is sent to appropriate RF radios connected to the antennas.

In one embodiment, the electronic device 1005 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1022 is shown to control transmission and reception via antenna (1084, 1088), the electronic device 1005 may alternatively include multiple modems, each of which is configured to transmit/receive data via a different antenna and/or wireless transmission protocol.

The electronic device 1005 delivers and/or receives items, upgrades, and/or other information via the network. For example, the electronic device 1005 may download or receive items from an item providing system. The item providing system receives various requests, instructions and other data from the electronic device 1005 via the network. The item providing system may include one or more machines (e.g., one or more server computer systems, routers, gateways, etc.) that have processing and storage capabilities to provide the above functionality. Communication between the item providing system and the electronic device 1005 may be enabled via any communication infrastructure. One example of such an infrastructure includes a combination of a wide area network (WAN) and wireless infrastructure, which allows a user to use the electronic device 1005 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 1005.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
    a wireless local area network (WLAN) antenna;
    a personal area network (PAN) antenna;
    a processing device;
    a WLAN radio;
    a PAN radio; and
    radio frequency front-end (RFFE) circuitry coupled to the processing device, the WLAN antenna, and the PAN antenna, wherein the RFFE circuitry comprises:
        a first RF coupler coupled between the WLAN antenna and the WLAN radio;
        an interference compensation circuit coupled to the first RF coupler, the interference compensation circuit comprising a multi-bit digital attenuator that adjusts an amplitude of a copy of a first RF signal from the WLAN radio and a multi-bit phase shifter circuit that adjusts a phase of the copy of the first RF signal;
        a power detector circuit coupled to the first RF coupler, the power detector circuit measures voltage values at the first RF coupler and provides digital values, corresponding to the voltage values, to the processing device, wherein the digital values are indicative of impedances of the WLAN antenna;
        a second RF coupler coupled between the PAN antenna, the PAN radio, and the interference compensation circuit, wherein the processing device executes an active interference cancellation (AIC) algorithm to control the interference compensation circuit to adjust the phase, the amplitude or both of the copy of the first RF signal to cancel interference in a second RF signal received at the PAN antenna, the interference being caused by the first RF signal; and
        wherein the processing device is configured to:
            determine that the digital values indicate a change in impedance that exceeds a threshold value; and
            perform re-calibration in the AIC algorithm.

2. The electronic device of claim 1, wherein the power detector circuit to detect impedance of the WLAN antenna, wherein the power detector circuit comprises:
    a load resistor coupled between the first RF coupler and ground;
    a diode coupled to the load resister, the load resistor and the diode to produce analog voltage values indicative of impedances of the WLAN antenna; and
    an analog-to-digital converter (ADC) coupled to the diode and the processing device, the ADC converts the analog voltage values to digital values and provides the digital values as feedback to the AIC algorithm, wherein the digital values are indicative of impedances of the WLAN antenna, wherein the ADC resides in the PAN radio and the PAN radio sends the digital values to the processing device as feedback to the AIC algorithm.

3. The electronic device of claim 1, wherein the RFFE circuitry further comprises:
    a fixed-delay filter coupled to the first RF coupler and the interference compensation circuit, the fixed-delay filter configured to provide a delay in a cancelation path between the first RF coupler and the second RF coupler;
    a first single pole, double throw (SPDT) switch coupled to the PAN radio; and
    a second SPDT switch coupled to the PAN antenna, wherein a first terminal of the first SPDT switch is coupled to the second RF coupler, wherein a first terminal of the second SPDT switch is coupled to the second RF coupler, and wherein a second terminal of the first SPDT switch is coupled to a second terminal of the second SPDT switch.

4. An apparatus comprising:
    a processing device; and
    radio frequency front-end (RFFE) circuitry coupled to the processing device, the RFFE circuitry comprising:
        a first RF coupler coupled between a first antenna and a first transceiver, the first RF coupler to create a copy of a first RF signal transmitted via the first antenna;
        a second RF coupler coupled between a second antenna and a second transceiver, the second antenna to receive a second RF signal, the second RF signal comprising interference caused by the first RF signal transmitted via the first antenna;
        an interference compensation circuit placed as part of an electrical path between the first RF coupler and the second RF coupler, wherein the processing device is operable to control the interference compensation circuit to adjust a phase, an amplitude or both of the copy of the first RF signal to generate a third RF signal, and wherein the second RF coupler adds the third RF signal to the second RF signal causing the interference to be canceled; and
        a power detector circuit coupled to the first RF coupler, the power detector circuit to detect a change in impedance of the first antenna.

5. The apparatus of claim 4, further comprising a fixed-delay filter coupled to the first RF coupler and the interference compensation circuit, wherein the interference compensation circuit comprises:
    a multi-bit digital attenuator to adjust the amplitude of the first RF signal; and
    a multi-bit phase shifter circuit to adjust the phase of the first RF signal.

6. The apparatus of claim 4, wherein the power detector circuit comprises:

a resistor coupled between the first RF coupler and ground;

a non-linear semiconductor device coupled to the resister; and an analog-to-digital converter (ADC) coupled to the non-linear semiconductor device and the processing device, the ADC to convert analog voltage values to digital voltage values and provide the digital voltage values as feedback to the processing device.

7. The apparatus of claim 4, wherein the power detector circuit comprises a non-linear semiconductor device and an analog-to-digital converter (ADC), wherein the apparatus further comprises an integrated circuit die comprising the interference compensation circuit and the non-linear semiconductor device, and wherein the ADC resides in a second radio comprising the second transceiver.

8. The apparatus of claim 4, wherein the power detector circuit comprises a non-linear semiconductor device and an analog-to-digital converter (ADC), wherein the apparatus further comprises an integrated circuit die comprising the interference compensation circuit and the non-linear semiconductor device, and wherein the ADC resides in a first radio comprising the first transceiver.

9. The apparatus of claim 4, wherein the power detector circuit comprises a non-linear semiconductor device and an analog-to-digital converter (ADC), wherein the apparatus further comprises an integrated circuit die comprising the interference compensation circuit and the non-linear semiconductor device, and wherein the ADC resides in the processing device.

10. The apparatus of claim 4, wherein the first transceiver and the second transceiver operate in a same frequency range concurrently without time-switching.

11. The apparatus of claim 4, further comprising a bypass circuit comprising:

a first single pole, double throw (SPDT) switch coupled to the second transceiver; and a second SPDT switch coupled to the second antenna, wherein a first terminal of the first SPDT switch is coupled to the second RF coupler, wherein a first terminal of the second SPDT switch is coupled to the second RF coupler, and wherein a second terminal of the first SPDT switch is coupled to a second terminal of the second SPDT switch.

12. The apparatus of claim 4, wherein:

the processing device is operable to execute an active interference cancellation (AIC) algorithm, the AIC algorithm to control parameters of the interference compensation circuit to adjust the phase, the amplitude or both of the copy of the first RF signal to generate the third RF signal;

the power detector circuit to measure voltage values at the first RF coupler;

the power detector circuit to provide digital values, corresponding to the voltage values, to the processing device;

the digital values are indicative of impedances of the first antenna; and the processing device triggers a re-calibration of the parameters of the interference compensation circuit when the digital values, received from the power detector circuit, indicate a change in impedance that exceeds a threshold value.

13. The apparatus of claim 4, wherein the RFFE circuitry further comprises:

a third RF coupler coupled between a third antenna and a third transceiver, the third RF coupler to create a copy of a fourth RF signal transmitted via the third antenna;

a fourth RF coupler coupled between a fourth antenna and a fourth transceiver, the fourth antenna to receive a fifth RF signal, the fifth RF signal comprising interference caused by the fourth RF signal transmitted via the third antenna;

a second interference compensation circuit placed as part of an electrical path between the third RF coupler and the fourth RF coupler, wherein the processing device is operable to control the second interference compensation circuit to adjust a phase, an amplitude or both of the copy of the fourth RF signal to generate a sixth RF signal, and wherein the fourth RF coupler adds the sixth RF signal to the fifth RF signal causing the interference to be canceled; and a second power detector circuit coupled to the third RF coupler, the second power detector circuit to detect a change in impedance of the third antenna.

14. The apparatus of claim 13, wherein:

the processing device is operable to execute an active interference cancellation (AIC) algorithm, the AIC algorithm is to control second parameters of the second interference compensation circuit to adjust the phase, the amplitude or both of the copy of the fourth RF signal to generate the sixth RF signal;

the second power detector circuit to measure second voltage values at the third RF coupler;

the second power detector circuit to provide second digital values, corresponding to the second voltage values, to the processing device;

the second digital values are indicative of impedances of the third antenna; and the processing device triggers a re-calibration of the second parameters of the interference compensation circuit when the second digital values, received from the second power detector circuit, indicate a change in impedance that exceeds a threshold value.

15. A method comprising:

instructing, by a processing device, a first transceiver to transmit a first radio frequency (RF) signal via a first antenna;

instructing, by the processing device, a second transceiver to receive a second RF signal via a second antenna, the second RF signal includes interference caused by the first RF signal transmitted through an antenna path from the first antenna to the second antenna;

controlling, by the processing device, an interference compensation circuit, disposed on a cancelation path between the first transceiver and the second transceiver, to generate a third RF signal by adjusting a phase, an amplitude or both of a copy of a first RF signal transmitted via the first antenna, wherein the third RF signal is added to the second RF signal to cancel the interference from the second RF signal;

detecting, by the processing device, a change in impedance of the first antenna; and calibrating, by the processing device, parameters of the interference compensation circuit to cancel the interference from subsequent RF signals received by the second antenna.

16. The method of claim 15, further comprising determining, by the processing device, the amplitude and the phase for the third RF signal that result in a lowest interference in the second RF signal.

17. The method of claim 16, wherein determining the amplitude and phase comprises:
- setting a first amplitude value and a first phase value;
- generating the third RF signal having the first amplitude value and the first phase value;
- measuring a power of the third RF signal; and
- adjusting the first amplitude value, the first phase value, or both to find a minimum power by the third RF signal.

18. The method of claim 15, wherein the detecting the change in impedance of the first antenna comprises
- receiving a digital value from a power detector circuit, the digital value is indicative of an impedance of the first antenna; and
- determining that the digital value exceeds a threshold value, wherein the digital value exceeding the threshold value is a trigger for the calibrating the parameters.

19. The method of claim 15, wherein the detecting the change in impedance of the first antenna comprises
- receiving a digital value from an analog-to-digital converter (ADC) of a second radio comprising the second transceiver, the digital value indicating an impedance of the first antenna; and
- determining that the digital value exceeds a threshold value, wherein the digital value exceeding the threshold value is a trigger for the calibrating the parameters.

20. The method of claim 15, wherein the detecting the change in impedance of the first antenna comprises
- receiving a digital value from an analog-to-digital converter (ADC) of a first radio comprising the first transceiver, the digital value indicating an impedance of the first antenna; and
- determining that the digital value exceeds a threshold value, wherein the digital value exceeding the threshold value is a trigger for the calibrating the parameters.

* * * * *